(12) United States Patent
Hu et al.

(10) Patent No.: US 12,507,106 B2
(45) Date of Patent: Dec. 23, 2025

(54) COMMUNICATION METHOD AND COMMUNICATION APPARATUS

(71) Applicant: HUAWEI TECHNOLOGIES CO., LTD., Guangdong (CN)

(72) Inventors: Xingxing Hu, Shanghai (CN); Hongping Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 364 days.

(21) Appl. No.: 18/155,447

(22) Filed: Jan. 17, 2023

(65) Prior Publication Data
US 2023/0156767 A1 May 18, 2023

Related U.S. Application Data

(63) Continuation of application No. PCT/CN2020/103391, filed on Jul. 22, 2020.

(51) Int. Cl.
*H04B 17/20* (2015.01)
*H04W 8/18* (2009.01)
(Continued)

(52) U.S. Cl.
CPC .......... *H04W 24/10* (2013.01); *H04B 17/252* (2023.05); *H04B 17/254* (2023.05);
(Continued)

(58) Field of Classification Search
CPC .. H04B 17/20–297; H04L 41/08–5096; H04L 43/02–55; H04L 65/60–80;
(Continued)

(56) References Cited

U.S. PATENT DOCUMENTS

| 2022/0417780 A1* | 12/2022 | Liu | H04W 24/10 |
| 2023/0216751 A1* | 7/2023 | Barac | H04W 24/08 |
| 2023/0284058 A1* | 9/2023 | Eklöf | H04W 24/08 |

FOREIGN PATENT DOCUMENTS

| CN | 107534887 A | 1/2018 |
| CN | 107659955 A | 2/2018 |

(Continued)

OTHER PUBLICATIONS

Extended European Search Report in European Appln No. 20946141.7, dated Jul. 19, 2023, 10 pages.

(Continued)

*Primary Examiner* — Timothy J Weidner
(74) *Attorney, Agent, or Firm* — Fish & Richardson P.C.

(57) ABSTRACT

This application provides communication methods and communication apparatuses. One example communication method includes: An receiving, by an access stratum of a terminal device, receives a quality of experience QoE measurement result and first indication information from an upper layer of the access stratum. The access stratum of the terminal device determines, based on the first indication information, to send the QoE measurement result to a master node or a secondary node of the terminal device. Therefore, in this application, the upper layer of the access stratum of the terminal device sends, to the access stratum, the QoE measurement result and the first indication information corresponding to the Qof measurement result, so that the terminal device in the MR DC architecture can send the QoE measurement result to the correct access network device.

20 Claims, 10 Drawing Sheets

(51) Int. Cl.
*H04W 8/22* (2009.01)
*H04W 24/08* (2009.01)
*H04W 24/10* (2009.01)
*H04W 72/20* (2023.01)
*H04W 72/542* (2023.01)
*H04W 84/02* (2009.01)
*H04W 88/02* (2009.01)
*H04W 88/08* (2009.01)
*H04W 88/14* (2009.01)
*H04W 92/02* (2009.01)
*H04W 92/04* (2009.01)
*H04W 92/10* (2009.01)
*H04W 92/20* (2009.01)

(52) U.S. Cl.
CPC ............... *H04W 8/18* (2013.01); *H04W 8/22* (2013.01); *H04W 24/08* (2013.01); *H04W 72/20* (2023.01); *H04W 72/542* (2023.01); *H04W 84/02* (2013.01); *H04W 88/02* (2013.01); *H04W 88/08* (2013.01); *H04W 88/14* (2013.01); *H04W 92/02* (2013.01); *H04W 92/045* (2013.01); *H04W 92/10* (2013.01); *H04W 92/20* (2013.01)

(58) Field of Classification Search
CPC ..... H04W 8/22–245; H04W 24/02–10; H04W 28/02–26; H04W 36/0005–385; H04W 72/02–569; H04W 76/10–50; H04W 80/02–12; H04W 84/005–22; H04W 88/005–188; H04W 92/02–24
See application file for complete search history.

(56) References Cited

FOREIGN PATENT DOCUMENTS

| WO | 2019065617 A1 | 4/2019 |
| WO | 2019073340 A1 | 4/2019 |
| WO | 2020034587 A1 | 2/2020 |
| WO | 2020128657 A1 | 6/2020 |

OTHER PUBLICATIONS

LG Electronics, "Immediate MDT for DC," 3GPP TSG-RAN WG2 Meeting #106, Renoina, R2-1908064, May 13-17, 2019, 2 pages.

3GPP TS 36.331 V16.0.0, "3rd Generation Partnership Project; Technical Specification Group Radio Access Network; Evolved Universal Terrestrial Radio Access (E-UTRA); Radio Resource Control (RRC); Protocol specification (Release 16)," Mar. 2020, 1048 pages.

Huawei et al., "Introduction of QoE Measurement Collection for LTE," 3GPP TSG-RAN WG2 Meeting #102, R2-1807410, Busan, Korea, May 21-25, 2018, 30 pages.

3GPP TS 38.331 V16.0.0, "3rd Generation Partnership Project; Technical Specification Group Radio Access Network; NR; Radio Resource Control (RRC) protocol specification (Release 16)," Mar. 2020, 835 pages.

3GPP TS 36.413 V16.2.0, "3rd Generation Partnership Project; Technical Specification Group Radio Access Network; Evolved Universal Terrestrial Radio Access Network (E-UTRAN); S1 Application Protocol (S1AP) (Release 16)," Jul. 2020, 422 pages.

International Search Report and Written Opinion in International Appln. No. PCT/CN2020/103391, mailed on Apr. 23, 2021, 15 pages (with English translation).

\* cited by examiner

COMMUNICATION METHOD AND COMMUNICATION APPARATUS

CROSS-REFERENCE TO RELATED APPLICATIONS

This application is a continuation of International Patent Application No. PCT/CN2020/103391, filed on Jul. 22, 2020. The disclosure of the aforementioned application is hereby incorporated by reference in its entirety.

TECHNICAL FIELD

This application relates to the communications field, and more specifically, to a communication method and a communication apparatus.

BACKGROUND

For some streaming services or voice services, such as a streaming service (streaming service) or a multimedia telephony service for internet protocol (internet protocol, IP) multimedia system (multimedia telephony service for IMS, MTSI), signal quality alone cannot reflect experience of a user when the user uses these services. By learning of user experience, a carrier can better optimize a network to improve user experience. Such measurement collection may be referred to as quality of experience (quality of experience, QoE) measurement collection (QoE measurement collection, QMC), or may also be referred to as application-layer measurement collection. During the QoE measurement collection, an access network device receives, from a core network (core network, CN) or an operation, administration and maintenance (operation, administration and maintenance, OAM), measurement configuration information for QoE measurement, and sends the measurement configuration information to a terminal device. After obtaining a measurement result based on the measurement configuration information, the terminal device sends the measurement result to the access network device.

In a multi-radio dual connectivity (multi-radio dual connectivity, MR-DC) architecture, the terminal device may simultaneously have communication connections to at least two access network devices, and may receive and send data. In the at least two access network devices, an access network device that is responsible for exchanging a radio resource control message with the terminal device and is responsible for interacting with a core network control plane entity may be referred to as a master node (master node, MN), and another access network device may be referred to as a secondary node (secondary node, SN). Both the MN and the SN may send, to the terminal device, measurement configuration information corresponding to QoE measurement. In this scenario, how the terminal device reports the QoE measurement result is a problem that needs to be studied.

SUMMARY

This application provides a communication method and a communication apparatus, to enable a terminal device in an MR-DC architecture to send a QoE measurement result to a correct access network device.

According to a first aspect, a communication method is provided. The method includes:

An access stratum of a terminal device receives a quality of experience QoE measurement result and first indication information from an upper layer of the access stratum.

The access stratum of the terminal device determines, based on the first indication information, to send the QoE measurement result to a master node or a secondary node of the terminal device.

Therefore, in this embodiment of this application, the upper layer of the access stratum of the terminal device sends, to the access stratum, the QoE measurement result and the first indication information corresponding to the QoE measurement result, so that the access stratum can determine, based on the first indication information, to send the QoE measurement result to the master node or the secondary node of the terminal device, and thus the terminal device in an MR-DC architecture can send the QoE measurement result to a correct access network device.

It should be noted that the terminal device may determine, based on the first indication information, to send the QoE measurement result to the master node or the secondary node of the terminal device. In a possible implementation, the indication information #1 may explicitly indicate to "send the QoE measurement result to the MN of the terminal device" or "send the QoE measurement result to the SN of the terminal device". In another possible implementation, the indication information #1 may implicitly indicate to "send the QoE measurement result to the MN of the terminal device" or "send the QoE measurement result to the SN of the terminal device".

In some implementations, when time at which an application layer of the terminal device performs QoE measurement based on at least two application-layer measurement configurations overlaps, or periodicities of reporting QoE measurement corresponding to the at least two application-layer measurement configurations overlap, when receiving the QoE measurement result from the upper layer, the access stratum of the terminal device may not be capable of learning of a specific QoE measurement configuration to which the QoE measurement result corresponds, and thus may not be capable of determining whether to send the QoE measurement result to the master node or the secondary node. In this case, if the access stratum can receive the first indication information corresponding to the QoE measurement result, the terminal device may determine, based on the first indication information, whether to send the QoE measurement result to the master node or the secondary node.

Alternatively, in some implementations, even if the application layer of the terminal device receives only one application-layer measurement configuration, to be compatible with a scenario in which at least two application-layer measurement configurations are subsequently extended to perform QoE measurement, the access stratum may be enabled to receive the first indication information corresponding to the QoE measurement result, and determine, based on the first indication information, whether to send the QoE measurement result to the master node or the secondary node.

For example, the first indication information may include at least one of a trace identifier (trace ID), TCE ID, QoE service type (service type) information, node type (node type) information, RAT type (type) information, a PDU session identifier (PDU session ID), a 5G quality of service identifier (5G QoS identifier, 5QI), a quality of service flow identifier (QoS Flow identifier, QFI), and a first identifier, where the first identifier is allocated by an OAM or an access network device. The node type information may indicate the master node or the secondary node. In a specific example, the first identifier may be a base station identifier or a measurement task identifier. This is not limited in this embodiment of this application.

With reference to the first aspect, in some implementations of the first aspect, before that an access stratum of a terminal device receives a QoE measurement result and first indication information from an upper layer of the access stratum, the method further includes:

The access stratum of the terminal device receives first configuration information from a first access network device, where the first configuration information indicates the terminal device to perform application-layer QoE measurement, and the first access network device is the master node or the secondary node of the terminal device. In other words, the master node may send the first configuration information to the access stratum of the terminal device, to indicate the terminal device to perform the application-layer QoE measurement, or the secondary node may send the first configuration information to the access stratum of the terminal device, to indicate the terminal device to perform the application-layer QoE measurement.

Then, the access stratum of the terminal device sends the first configuration information and the first indication information to the upper layer of the access stratum of the terminal device.

Therefore, the access stratum of the terminal device sends, to the upper layer of the access stratum, the first configuration information and the first indication information corresponding to the first configuration information, so that the upper layer can obtain, when obtaining the QoE measurement result based on the first configuration information, the first indication information corresponding to the QoE measurement result. Then, the upper layer of the access stratum of the terminal device sends the QoE measurement result and the first indication information to the access stratum of the terminal device, so that the access stratum can determine, based on the first indication information, whether to send the QoE measurement result to the master node or the secondary node.

In some embodiments, the first indication information may be determined by the upper layer of the access stratum, for example, determined based on an application-layer measurement configuration indicating the terminal device to perform QoE measurement, or related information (for example, service type information) sent together with the application-layer measurement configuration. This is not limited in this application.

With reference to the first aspect, in some implementations of the first aspect, the method further includes:

The access stratum of the terminal device receives second indication information from the first access network device, where the second indication information indicates that the first access network device is the master node or the secondary node.

The access stratum determines the first indication information based on the second indication information.

For example, the second indication information may include at least one of a trace ID, a TCE ID, QoE service type (service type) information, node type information, RAT type information, a PDU session identifier, a 5G quality of service identifier (5G QoS identifier, 5QI), a quality of service flow identifier (QoS Flow identifier, QFI), and a first identifier, where the first identifier is allocated by an OAM or an access network device.

In an example, the second indication information and the first indication information may be a same piece of information. In other words, the first indication information and the second indication information include same content. For example, when the access stratum of the terminal device receives the second indication information sent by the first access network device, the access stratum may send the second indication information to the upper layer of the access stratum, to send the first indication information to the upper layer. In this case, the terminal device does not need to regenerate the first indication information, to help reduce terminal complexity.

In some embodiments, the access stratum of the terminal device may further determine the first indication information based on a source (for example, the master node or the secondary node) of the first configuration information. This is not limited in this application.

Therefore, in this embodiment of this application, the first indication information is determined based on the second indication information, or the first indication information is determined depending on whether an access network device that sends the first configuration information is the master node or the secondary node, so that the first indication information can indicate to send, to the access network device that sends the first configuration information, the QoE measurement result obtained by performing the QoE measurement based on the first configuration information, to help the terminal device send the QoE measurement result to a correct access network device.

With reference to the first aspect, in some implementations of the first aspect, before that an access stratum of a terminal device receives a QoE measurement result and first indication information from an upper layer of the access stratum, the method further includes:

The access stratum of the terminal device receives third indication information from a second access network device, where the third indication information indicates the access stratum of the terminal device to send the QoE measurement result to a first access network device.

The first access network device is the master node and the second access network device is the secondary node, or the first access network device is the secondary node and the second access network device is the master node.

Therefore, in this embodiment of this application, a specific access network device to which the terminal device reports the QoE measurement result is indicated by using an access network device, so that the terminal device only needs to send the QoE measurement result to the specific access network device based on an indication of the access network device. This can help reduce processing complexity of the terminal device, and help a network side determine, based on load of a node, the specific access network device to which the QoE measurement result is sent, to reduce load of an access network device that receives the QoE measurement result.

With reference to the first aspect, in some implementations of the first aspect, the method further includes:

The access stratum of the terminal device determines that a bearer type corresponding to a service type of the QoE measurement changes.

The access stratum of the terminal device sends first information to the upper layer of the access stratum when the bearer type changes, where the first information is used to trigger reporting of the QoE measurement result, or the first information is used to notify bearer types corresponding to the service type of the QoE measurement before and after the change.

Therefore, in this embodiment of this application, when the network side changes a bearer type of a service, the terminal device may send, to an access network device, the bearer type of the service type corresponding to the QoE measurement result, and then the access network device may send the bearer type to a TCE, so that the TCE can associate the QoE measurement result with the bearer type of the service type of the QoE measurement, to help optimize a network based on the QoE measurement result and the associated bearer type of the service type.

With reference to the first aspect, in some implementations of the first aspect, when the first information is used to notify the bearer types corresponding to the service type of the QoE measurement before and after the change, the method further includes:

The access stratum of the terminal device receives second information from the upper layer of the access stratum, where the second information indicates bearer types of the service type corresponding to the QoE measurement result in different time periods.

Therefore, in this embodiment of this application, when the network side changes a bearer type of a service, the terminal device may send, to the access network device, the bearer type of the service type corresponding to the QoE measurement result, and then the access network device may send the bearer type to the TCE, so that the TCE can associate the QoE measurement result with the bearer type of the service type of the QoE measurement, to help optimize a network based on the QoE measurement result and the associated bearer type of the service type.

With reference to the first aspect, in some implementations of the first aspect, the method further includes:

The access stratum of the terminal device receives, from the upper layer of the access stratum, time information corresponding to the bearer types in the different time periods.

With reference to the first aspect, in some implementations of the first aspect, the method further includes:

The terminal device receives third information from a third access network device, where the third information indicates an area scope of the QoE measurement, the area scope includes area scopes of at least two RATs, and the third access network device is the master node or the secondary node of the terminal device.

Therefore, in this embodiment of this application, in an MR-DC scenario, a network-side device may still configure information about area scopes of a plurality of RATs for the QoE measurement, so that the terminal device in the MR-DC scenario can also perform the QoE measurement in areas of the plurality of RATs.

According to a second aspect, a communication method is provided. The method includes:

An access stratum of a terminal device receives first configuration information from a first access network device, where the first configuration information indicates the terminal device to perform application-layer quality of experience QoE measurement.

The access stratum of the terminal device receives second indication information from the first access network device, where the second indication information indicates that the first access network device is a master node or a secondary node of the terminal device.

The access stratum of the terminal device sends the first configuration information and the second indication information to an upper layer of the access stratum.

The access stratum of the terminal device receives a QoE measurement result and the second indication information from the upper layer of the access stratum, where the QoE measurement result is obtained by performing the QoE measurement by the upper layer based on the first configuration information.

The access stratum of the terminal device sends the second indication information and the QoE measurement result to a second access network device, where the first access network device is the same as the second access network device, the first access network device is the master node and the second access network device is the secondary node, or the first access network device is the secondary node and the second access network device is the master node.

Therefore, in this embodiment of this application, the access stratum of the terminal device may be configured to send the QoE measurement result and the second indication information to the master node (or the secondary node) in a unified manner, and then the master node (or the secondary node) sends the QoE measurement result to a network device based on the second indication information. In other words, the access stratum of the terminal device sends the measurement result to the master node (or the secondary node) without a need of determining whether the first configuration information corresponding to the QoE measurement result is sent by the master node or the secondary node, to reduce processing complexity of the terminal device.

It should be noted that, that the access stratum of the terminal device sends the second indication information to the upper layer of the access stratum means that the access stratum may directly send the second indication information to the upper layer, and the access stratum does not need to learn of (or perceive, or know) content of the second indication information. In addition, the upper layer may directly send the second indication information to the access stratum, and does not need to learn of (or perceive, or know) the content of the second indication information.

With reference to the second aspect, in some implementations of the second aspect, the second indication information includes at least one of a trace ID, a trace collection entity identifier TCE ID, a QoE service type, a node type, a radio access technology RAT type, a PDU session identifier, a 5G quality of service identifier 5QI, a quality of service flow identifier QFI, and a first identifier, where the first identifier is allocated by an operation, administration and maintenance OAM or an access network device.

According to a third aspect, a communication method is provided. The method includes:

A first access network device receives a quality of experience QoE measurement result and second indication information from a terminal device, where the QoE measurement result is obtained by performing QoE measurement by the terminal device based on first configuration information, the second indication information indicates that a second access network device that sends the first configuration information to the terminal device is a master node or a secondary node of the terminal device, and the first configuration information indicates the terminal device to perform the application-layer QoE measurement.

The first access network device sends the QoE measurement result to a network device based on the second indication information, where the first access network device is the same as the second access network device, the first access network device is the master node and the second access network device is the secondary node, or the first access network device is the secondary node and the second access network device is the master node.

Therefore, in this embodiment of this application, an access stratum of the terminal device may be configured to send the QoE measurement result and the second indication information to the first access network device (where the first access network device is, for example, the master node or the secondary node of the terminal device) in a unified manner, and then the first access network device sends the QoE measurement result to the network device based on the second indication information. In other words, the access stratum of the terminal device sends the measurement result to the first access network device without a need of determining whether the first configuration information corresponding to the QoE measurement result is sent by the master node or the secondary node, to reduce processing complexity of the terminal device.

It should be noted that, when receiving the QoE measurement result from the access stratum of the terminal device, the first access network device may learn, based on the second indication information, whether the QoE measurement result is a QoE measurement result corresponding to an application-layer measurement configuration sent by the master node or a QoE measurement result corresponding to an application-layer measurement configuration sent by the secondary node.

With reference to the third aspect, in some implementations of the third aspect, the first access network device is the same as the second access network device.

That the first access network device sends the QoE measurement result to a network device based on the second indication information includes:

The first access network device sends the QoE measurement result to a trace collection entity TCE corresponding to the first access network device.

In other words, when the first access network device determines, based on the second indication information, that the first configuration information corresponding to the QoE measurement result received from the terminal device is sent by the first access network device, the first access network device may send the QoE measurement result to the TCE corresponding to the first access network device.

With reference to the third aspect, in some implementations of the third aspect, the first access network device is the master node and the second access network device is the secondary node, or the first access network device is the secondary node and the second access network device is the master node.

That the first access network device sends the QoE measurement result to a network device based on the second indication information includes:

The first access network device sends the QoE measurement result to a TCE corresponding to the second access network device, or the first access network device sends the QoE measurement result to the second access network device.

In other words, when the first access network device determines, based on the second indication information, that the first configuration information corresponding to the QoE measurement result received from the terminal device is not sent by the first access network device (for example, is sent by the second access network device), the first access network device may send the QoE measurement result to the TCE corresponding to the second access network device, or send the QoE measurement result to the second access network device.

With reference to the third aspect, in some implementations of the third aspect, the second indication information includes at least one of a trace ID, a trace collection entity identifier TCE ID, a QoE service type, a node type, a radio access technology RAT type, a PDU session identifier, a 5G quality of service identifier 5QI, a quality of service flow identifier QFI, and a first identifier, where the first identifier is allocated by an operation, administration and maintenance OAM or an access network device.

With reference to the third aspect, in some implementations of the third aspect, the second indication information includes the trace collection entity TCE identity ID.

That the first access network device sends the QoE measurement result to a network device based on the second indication information includes:

The first access network device obtains, based on a relationship between a TCE ID and a TCE IP, a TCE IP corresponding to the TCE ID.

The first access network device sends the QoE measurement result to a TCE corresponding to the TCE IP.

Optionally, the second access network device may send, to the first access network device, a TCE ID that corresponds to the QoE measurement and that is configured by the second access network device and a TCE IP address corresponding to the TCE ID. Alternatively, the second access network device may send, to the first access network device, a TCE IP address that corresponds to the QoE measurement and that is configured by the second access network device. In this way, when the first access network device determines that the first configuration information is sent by the second access network device, to be specific, the first configuration information corresponding to the QoE measurement result received from the terminal device is sent by the second access network device, the first access network device may send, based on the TCE IP address that corresponds to the QoE measurement and that is configured by the second access network device, the QoE measurement result to the TCE corresponding to the second access network.

With reference to the third aspect, in some implementations of the third aspect, the second indication information includes the trace ID.

That the first access network device sends the QoE measurement result to a network device based on the second indication information includes:

The first access network device sends the QoE measurement result and the trace ID to the TCE.

In this way, when a TCE ID that corresponds to the QoE measurement and that is sent by the first access network device is the same as the TCE ID that corresponds to the QoE measurement and that is sent by the second access network device, when receiving the QoE measurement result and the trace ID, the TCE can determine, based on the trace ID, whether the QoE measurement result corresponds to the first configuration information configured by the first access network device or corresponds to the first configuration information configured by the second access network device. For example, when the trace ID is allocated by a CN, an OAM, or an EM to the master node for performing the QoE measurement, the QoE measurement result corresponds to the first configuration information configured by the master node; or when the trace ID is allocated by the CN, the OAM, or the EM to the secondary node for performing the QoE measurement, the QoE measurement result corresponds to the first configuration information configured by the secondary node.

With reference to the third aspect, in some implementations of the third aspect, before that a first access network device receives a QoE measurement result and second indication information from a terminal device, the method further includes:

The first access network device sends the first configuration information and the second indication information to the terminal device.

In other words, an access network device that sends the first configuration information and the second indication information to the terminal device and an access network device that receives the QoE measurement result and the second indication information are a same access network device, for example, both are the master node or both are the secondary node.

According to a fourth aspect, a communication method is provided. The method includes:

An access network device receives a QoE measurement result from a terminal device.

The access network device sends the QoE measurement result and second information to a TCE, where the second information indicates bearer types corresponding to a service type corresponding to the QoE measurement result in different time periods.

Therefore, in this embodiment of this application, when a network side changes a bearer type of a service, the access network device may send, to the access network device, the bearer type of the service type corresponding to the QoE measurement, so that the TCE can associate the QoE measurement result with the bearer type of the service type of the QoE measurement, to help optimize a network based on the QoE measurement result and the associated bearer type of the service type.

With reference to the fourth aspect, in some implementations of the fourth aspect, the access network device may determine the bearer types of the service type corresponding to the QoE measurement result in the different time periods. In other words, the access network device can record the bearer type of the service type corresponding to the QoE measurement, and send, to the TCE, the bearer types corresponding to the service type corresponding to the QoE measurement result in the different time periods.

With reference to the fourth aspect, in some implementations of the fourth aspect, the access network device may further determine time information corresponding to the bearer types in the different time periods, and send the time information to the TCE.

With reference to the fourth aspect, in some implementations of the fourth aspect, the access network device receives, from the terminal device, the bearer types of the service type corresponding to the QoE measurement result in the different time periods. In other words, the terminal device may send, to the access network device, the bearer type of the service type corresponding to the QoE measurement result, and then the access network device may send, to the TCE, the bearer type of the service type corresponding to the QoE measurement result.

With reference to the fourth aspect, in some implementations of the fourth aspect, the access network device may further receive, from the terminal device, the time information corresponding to the bearer types in the different time periods, and send, to the TCE, the time information corresponding to the bearer types in the different time periods.

Optionally, the access network device may further indicate a network architecture to the TCE, for example, whether an integrated access and backhaul (integrated access and backhaul, IAB) network architecture is used, or whether a CU/DU network architecture is used.

According to a fifth aspect, a communication method is provided. In the method, an access network device may receive third information from a CN/an OAM/an EM, where the third information indicates an area scope of QoE measurement, and the area scope includes area scopes of at least two RATs.

The access network device sends first configuration information to a terminal device based on information about the area scope, where the first configuration information indicates the terminal device to perform the application-layer quality of experience QoE measurement.

For example, when the access network device determines that the terminal device is currently located in an area scope of a RAT 1 in the area scope of the QoE measurement, or located in an area scope of a RAT 2 in the area scope of the QoE measurement, the access network device may send the first configuration information to the terminal device. When the access network device determines that the terminal device is currently not located in the area scope of the RAT 1 in the area scope of the QoE measurement, and not located in the area scope of the RAT 2 in the area scope of the QoE measurement, the access network device may not send the first configuration information to the terminal device.

Therefore, in this embodiment of this application, in an MR-DC scenario, a network-side device may still configure information about area scopes of a plurality of RATs for the QoE measurement, so that the terminal device in the MR-DC scenario can also perform the QoE measurement in areas of the plurality of RATs.

In some optional implementations, when a network side needs to change a bearer type of a service of the QoE measurement, if an area scope corresponding to a target bearer type that needs to be changed is not within the area scope of the QoE measurement, the access network device may determine not to change bearer type of the service. In this way, when the access network device changes the bearer type corresponding to the service of the QoE measurement, the QoE measurement may still be performed.

Alternatively, in some optional implementations, when a network side needs to change a bearer type of a service of the QoE measurement, if an area scope corresponding to a target bearer type that needs to be changed is not within the area scope of the QoE measurement, the access network device may notify the terminal device to stop current QoE measurement, stop reporting of a QoE measurement result, or continue QoE measurement corresponding to an already-started session in a service type corresponding to the current QoE measurement, but no longer perform QoE measurement for a subsequent new session.

With reference to the fifth aspect, in some implementations of the fifth aspect, the access network device may send the third information to the terminal device. In this way, when the terminal device determines that the area scope corresponding to the bearer type of the service of the QoE measurement is not within the area scope of the QoE measurement, the terminal device may stop the current QoE measurement, stop the reporting of the QoE measurement result, or continue the QoE measurement corresponding to the already-started session in the current QoE measurement, but no longer perform the QoE measurement for the subsequent new session.

According to a sixth aspect, a communication method is provided. The communication method includes:

An access stratum of a terminal device determines that a bearer type corresponding to a service type of QoE measurement changes.

The access stratum of the terminal device sends first information to an upper layer of the access stratum when the bearer type changes, where the first information is used to trigger reporting of a QoE measurement result, or the first information is used to notify bearer types corresponding to the service type of the QoE measurement before and after the change.

Therefore, in this embodiment of this application, when a network side changes a bearer type of a service, the terminal device may send, to an access network device, the bearer type of the service type corresponding to the QoE measurement result, and then the access network device may send the bearer type to a TCE, so that the TCE can associate the QoE measurement result with the bearer type of the service type of the QoE measurement, to help optimize a network based on the QoE measurement result and the associated bearer type of the service type.

With reference to the sixth aspect, in some implementations of the sixth aspect, when the first information is used to notify the bearer types corresponding to the service type of the QoE measurement before and after the change, the method further includes:

The access stratum of the terminal device receives second information from the upper layer of the access stratum, where the second information indicates bearer types of the service type corresponding to the QoE measurement result in different time periods.

Therefore, in this embodiment of this application, when the network side changes a bearer type of a service, the terminal device may send, to the access network device, the bearer type of the service type corresponding to the QoE measurement result, and then the access network device may send the bearer type to the TCE, so that the TCE can associate the QoE measurement result with the bearer type of the service type of the QoE measurement, to help optimize a network based on the QoE measurement result and the associated bearer type of the service type.

With reference to the sixth aspect, in some implementations of the sixth aspect, the method further includes:

The access stratum of the terminal device receives, from the upper layer of the access stratum, time information corresponding to the bearer types in the different time periods.

According to a seventh aspect, an embodiment of this application provides a communication apparatus, configured to perform the method in any one of the first aspect to the sixth aspect or the possible implementations of the first aspect to the sixth aspect. Specifically, the apparatus includes units or modules configured to perform the method in any one of the first aspect to the sixth aspect or the possible implementations of the first aspect to the sixth aspect.

According to an eighth aspect, an embodiment of this application provides a communication apparatus, including a processor and a transceiver. Optionally, the apparatus may further include a memory. The memory is configured to store instructions, and the processor is configured to execute the instructions stored in the memory. When the processor executes the instructions stored in the memory, the processor is enabled to perform the method in any one of the first aspect to the sixth aspect or the possible implementations of the first aspect to the sixth aspect.

According to a ninth aspect, a communication chip is provided. The communication chip includes a processor and a communication interface. The processor is configured to invoke instructions from the communication interface and run the instructions, and when the processor executes the instructions, the method in any one of the first aspect to the sixth aspect or the possible implementations of the first aspect to the sixth aspect is implemented.

Optionally, the communication chip may further include a memory. The memory stores instructions. The processor is configured to execute the instructions stored in the memory or other instructions. When the instructions are executed, the processor is configured to implement the method in any one of the first aspect to the sixth aspect or the possible implementations of the first aspect to the sixth aspect.

According to a tenth aspect, an embodiment of this application provides a computer-readable medium, configured to store a computer program. The computer program includes instructions for performing the method in any one of the first aspect to the sixth aspect or the possible implementations of the first aspect to the sixth aspect.

According to an eleventh aspect, an embodiment of this application further provides a computer program product including instructions. When the computer program product runs on a computer, the computer is enabled to perform the method in any one of the first aspect to the sixth aspect or the possible implementations of the first aspect to the sixth aspect.

According to a twelfth aspect, a communication system is provided. The communication system includes an apparatus having a function of implementing the method and the possible designs in the first aspect and an access network device, where the access network device may be, for example, an apparatus having a function of implementing the method and the possible designs in the fourth aspect, or an apparatus having a function of implementing the method and the possible designs in the fifth aspect.

Alternatively, the communication system includes an apparatus having a function of implementing the method and the possible designs in the second aspect, and an apparatus having a function of implementing the method and the possible designs in the third aspect.

DESCRIPTION OF EMBODIMENTS

Figure 1:
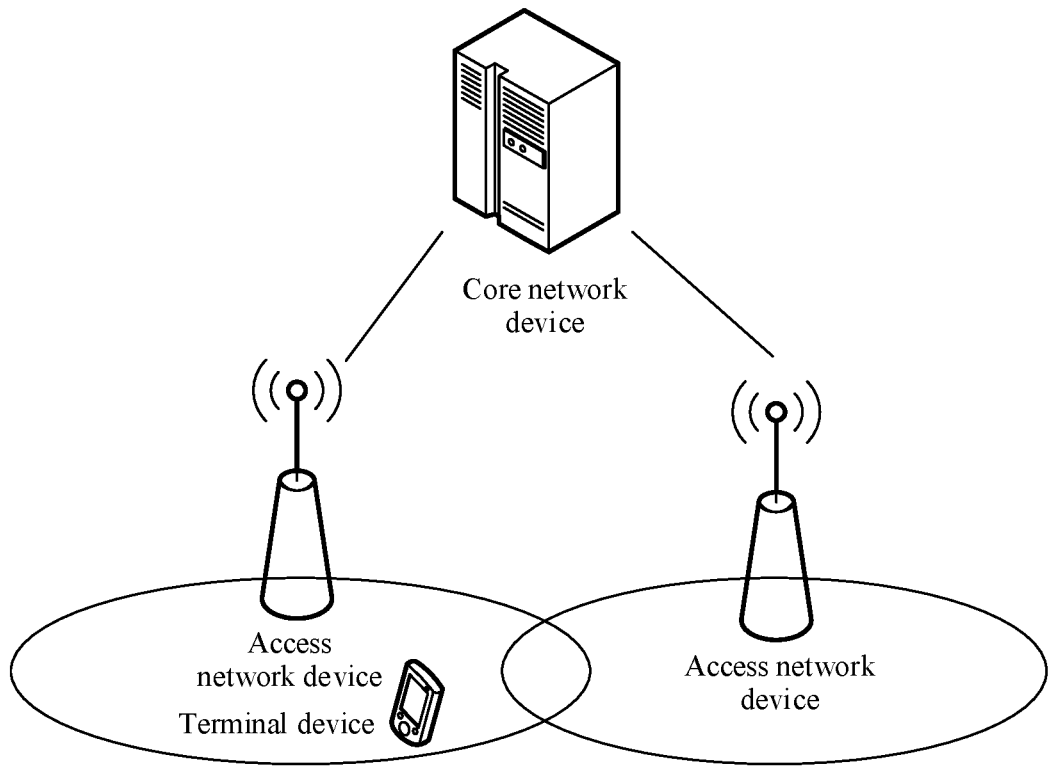
FIG. 1 is a schematic diagram of a structure of a communication system according to this application.

The following describes technical solutions of this application with reference to accompanying drawings.

The technical solutions in embodiments of this application may be used in various communication systems, for example, a long term evolution (long term evolution, LTE) system, LTE frequency division duplex (frequency division duplex, FDD), an LTE time division duplex (time division duplex, TDD) system, a universal mobile telecommunications system (universal mobile telecommunications system, UMTS), a 5th generation (5th generation, 5G) system, new radio (new radio, NR), or a future next-generation communication system.

A terminal device in embodiments of this application may also be referred to as user equipment (user equipment, UE), a mobile station (mobile station, MS), a mobile terminal (mobile terminal, MT), an access terminal, a subscriber unit, a subscriber station, a mobile station, a remote station, a remote terminal, a mobile device, a user terminal, a terminal, a wireless communication device, a user agent, a user apparatus, or the like.

The terminal device may be a device that provides voice/data connectivity for a user, for example, a handheld device or a vehicle-mounted device that has a wireless connection function. Currently, some examples of the terminal are a mobile phone (mobile phone), a tablet computer, a laptop computer, a palmtop computer, a mobile internet device (mobile internet device, MID), a wearable device, a virtual reality (virtual reality, VR) device, an augmented reality (augmented reality, AR) device, a wireless terminal in industrial control (industrial control), a wireless terminal in self driving (self driving), a wireless terminal in remote medical surgery (remote medical surgery), a wireless terminal in a smart grid (smart grid), a wireless terminal in transportation safety (transportation safety), a wireless terminal in a smart city (smart city), a wireless terminal in a smart home (smart home), a cellular phone, a cordless telephone set, a session initiation protocol (session initiation protocol, SIP) phone, a wireless local loop (wireless local loop, WLL) station, a personal digital assistant (personal digital assistant, PDA), a handheld device having a wireless communication function, a computing device or another processing device connected to a wireless modem, a vehicle-mounted device, a wearable device, a terminal device in a future 5G network, a terminal device in a future evolved public land mobile network (public land mobile network, PLMN), or the like. This is not limited in embodiments of this application.

By way of example and not limitation, in embodiments of this application, the terminal device may be alternatively a wearable device. The wearable device may also be referred to as a wearable intelligent device, and is a general term of a wearable device that is intelligently designed and developed for daily wear by using a wearable technology, for example, glasses, gloves, a watch, clothing, and shoes. The wearable device is a portable device that can be directly worn by a user or integrated into clothes or an accessory of a user. The wearable device is not only a hardware device, but also implements a powerful function through software support, data exchange, and cloud interaction. In a broad sense, wearable intelligent devices include full-featured and large-sized devices that can implement all or a part of functions without depending on smartphones, for example, smart watches or smart glasses, and include devices that focus on only one type of application function and need to collaboratively work with other devices such as smartphones, for example, various smart bands, or smart jewelry for monitoring physical signs.

In addition, in embodiments of this application, the terminal device may alternatively be a terminal device in an internet of things (internet of things, IoT) system. IoT is an important part of future information technology development. A main technical feature of the IoT is connecting things to networks by using communication technologies, to implement an intelligent network for interconnection between persons and machines, and between things.

In embodiments of this application, an IoT technology may implement massive connections, deep coverage, and terminal power saving by using, for example, a narrow band (narrow band, NB) technology. For example, an NB includes only one resource block (resource block, RB). In other words, a bandwidth of the NB is only 180 KB. To implement massive access, terminals need to be discrete in access. According to a communication method in embodiments of this application, a congestion problem that occurs in the IoT technology when massive terminals access a network by using the NB can be effectively resolved.

An access network device in embodiments of this application may be a device configured to communicate with the terminal device. The access network device may also be referred to as an access device or a radio access network device, and may be a base transceiver station (base transceiver station, BTS) in a global system for mobile communications (global system for mobile communications, GSM) or a code division multiple access (code division multiple access, CDMA) system, a NodeB (NodeB, NB) in a wideband code division multiple access (wideband code division multiple access, WCDMA) system, an evolved NodeB (evolved NodeB, eNB, or eNodeB) in an LTE system, or a radio controller in a cloud radio access network (cloud radio access network, CRAN) scenario. Alternatively, the access network device may be a relay station, an access point, a vehicle-mounted device, a wearable device, an access network device in a 5G network, an access network device in a future evolved PLMN network, or the like, or may be an access point (access point, AP) in a WLAN, or a gNB in a new radio (new radio, NR) system. This is not limited in embodiments of this application.

In addition, in embodiments of this application, the access network device is a device in a RAN, that is, is a RAN node that connects the terminal device to a wireless network. For example, by way of example and not limitation, the access network device may be a gNB, a transmission reception point (transmission reception point, TRP), an evolved NodeB (evolved NodeB, eNB), a radio network controller (radio network controller, RNC), a NodeB (NodeB, NB), a base station controller (base station controller, BSC), a base transceiver station (base transceiver station, BTS), a home base station (for example, a home evolved NodeB, or a home NodeB, HNB), a baseband unit (baseband unit, BBU), a wireless fidelity (wireless fidelity, Wi-Fi) access point (access point, AP), or the like. In a network structure, the access network device may be a RAN device including a centralized unit (centralized unit, CU) node and a distributed unit (distributed unit, DU) node, or a RAN device including a control plane CU node (CU-CP node), a user plane CU node (CU-UP node), and a DU node.

The access network device provides services for a cell. The terminal device communicates with the access network device by using a transmission resource (for example, a frequency domain resource, or in other words, a spectrum resource) used for the cell. The cell may be a cell corresponding to the access network device (for example, a base station), and the cell may belong to a macro base station, or may belong to a base station corresponding to a small cell (small cell). The small cell herein may include a metro cell (metro cell), a micro cell (micro cell), a pico cell (pico cell), a femto cell (femto cell), and the like. These small cells have features of small coverage and low transmit power, and are suitable for providing a high-rate data transmission service.

In addition, a plurality of cells may simultaneously work in a same frequency band on a carrier in the LTE system or the 5G system. In some special scenarios, it may be considered that a concept of the carrier is equivalent to that of the cell. For example, in a carrier aggregation (carrier aggregation, CA) scenario, both a carrier index of a secondary component carrier and a cell identifier (cell identifier, Cell ID) of a secondary cell that works on the secondary component carrier are carried when the secondary component carrier is configured for UE. In this case, it may be considered that the concept of the carrier is equivalent to that of the cell. For example, that the terminal device accesses a carrier is equivalent to that the terminal device accesses a cell.

In embodiments of this application, a core network device may be a device in a core network (core network, CN) that provides service support for the terminal device. Currently, some examples of the core network device are an access and mobility management function (access and mobility management function, AMF) entity, a session management function (session management function, SMF) entity, a user plane function (user plane function, UPF) entity, and the like, which are not listed one by one herein. For example, the AMF entity may be responsible for access management and mobility management of the terminal. The SMF entity may be responsible for session management, for example, user session establishment. The UPF entity may be a user-plane function entity, and is mainly responsible for a connection to an external network.

It should be noted that an entity in this application may also be referred to as a network element or a function entity. For example, the AMF entity may also be referred to as an AMF network element or an AMF function entity. For another example, the SMF entity may also be referred to as an SMF network element or an SMF function entity.

FIG. 1 is a schematic diagram of a network architecture according to an embodiment of this application. As shown in FIG. 1, a terminal device may have communication connections to two access network devices at the same time and may receive and send data. The communication connections may be referred to as dual connectivity (dual connectivity, DC) or multi-radio dual connectivity (multi-radio dual connectivity, MR-DC). In this way, a network side may provide a communication service for the terminal device by using resources of the two access network devices, to provide high-rate transmission for the terminal device. One of the two access network devices may be responsible for exchanging a radio resource control message with the terminal device and for interacting with a core network control plane entity. In this case, the access network device may be referred to as a master node (master node, MN), and the other radio access network device may be referred to as a secondary node (secondary node, SN).

In the MR-DC, the terminal device may alternatively have communication connections to a plurality of access network devices at the same time and may receive and send data. In the plurality of access network devices, one access network device may be responsible for exchanging a radio resource control message with the terminal device and for interacting with a core network control plane entity. In this case, the access network device may be referred to as an MN, and the other access network devices may be referred to as SNs.

In embodiments of this application, the two or more access network devices may be access network devices (for example, 4G base stations or 5G base stations) belonging to a same radio access technology (radio access technology, RAT), or may be access network devices (for example, one is a 4G base station and the other is a 5G base station) of different RATs.

The MR-DC may include a plurality of types, for example, evolved universal terrestrial radio access and new radio dual connectivity (E-UTRA-NR dual connectivity, EN-DC), evolved universal terrestrial radio access and new radio dual connectivity (NG-RAN E-UTRA-NR dual connectivity, NGEN-DC) of a next-generation radio access node, new radio and evolved universal terrestrial radio access dual connectivity (NR-E-UTRA dual connectivity, NE-DC), and new radio and new radio dual connectivity (NR-NR dual connectivity, NR-DC).

For example, in the EN-DC, the MN is an LTE base station (for example, an eNB) connected to an evolved packet core (evolved packet core, EPC) network, and the SN is an NR base station (for example, a gNB).

For example, in the NGEN-DC, the MN is an LTE base station (for example, an ng-eNB) connected to a 5G core network (5 generation core, 5GC), and the SN is an NR base station (for example, a gNB).

For example, in the NE-DC, the MN is an NR base station (for example, a gNB) connected to the 5GC, and the SN is an LTE base station (for example, an eNB).

For example, in the NR-DC, the MN is an NR base station (for example, a gNB) connected to the 5GC, and the SN is an NR base station (for example, a gNB).

For a terminal device in the MR-DC, a user plane of the SN may be connected to a core network connected to the MN, that is, the core network may directly send data to the terminal device via the SN.

In the MR-DC, there is one primary cell in the MN, and there is one primary secondary cell in the SN. The primary cell is a cell that is deployed at a primary frequency and in which the terminal device initiates an initial connection establishment process or initiates a connection reestablishment process, or that is indicated as a primary cell in a handover process. The primary secondary cell is a cell in which the terminal device initiates a random access process in the SN, a cell in which the terminal device skips a random access process in an SN change process and initiates data transmission, or a cell of the SN in which the terminal device initiates random access in a synchronous reconfiguration process.

An EN-DC network is sometimes referred to as a non-standalone (non-standalone, NSA) network, because in an initial phase of 5G, a terminal device in the EN-DC network cannot camp on an NR cell. An NR base station on which the terminal device can camp is sometimes referred to as a standalone (standalone, SA) NR base station.

Figure 2:
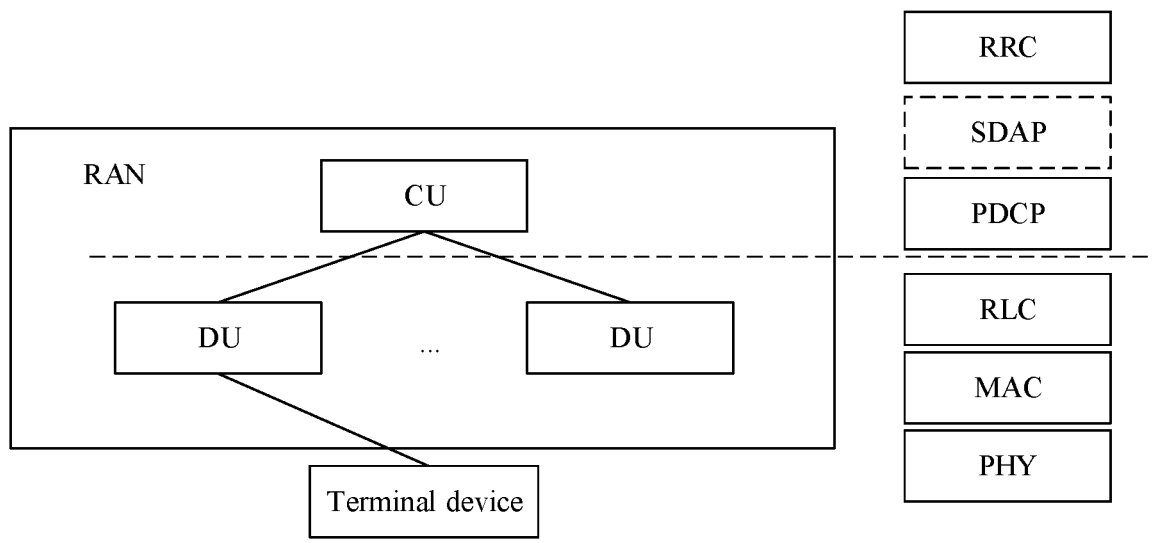
FIG. 2 is a schematic diagram of a structure of an access network device according to this application.

FIG. 2 is a schematic diagram of a network architecture according to an embodiment of this application. As shown in FIG. 2, communication between a RAN device and a terminal device complies with a specific protocol layer structure. For example, a control plane protocol layer structure may include functions of protocol layers such as a radio resource control (radio resource control, RRC) layer, a packet data convergence protocol (packet data convergence protocol, PDCP) layer, a radio link control (radio link control, RLC) layer, a media access control (media access control, MAC) layer, and a physical layer. A user plane protocol layer structure may include functions of protocol layers such as a PDCP layer, an RLC layer, a MAC layer, and a physical layer. In an implementation, a service data adaptation protocol (service data adaptation protocol, SDAP) layer is further included above the PDCP layer of the user plane protocol layer structure.

The functions of these protocol layers may be implemented by using one node, or may be implemented by using a plurality of nodes. For example, in an evolved structure, the RAN device may include a centralized (centralized unit, CU) and a distributed unit (distributed unit, DU), and a plurality of DUs may be controlled by one CU in a centralized manner.

As shown in FIG. 2, the CU and the DU may be obtained by division based on a protocol layer of a wireless network. For example, functions of the PDCP layer and a layer above the PDCP layer are set on the CU, and functions of protocol layers below the PDCP layer, such as the RLC layer and the MAC layer, are set on the DU. In other words, the CU has functions of layers (including the PDCP layer, an RRC layer, and an SDAP layer) above the PDCP layer, and the DU has functions of layers (including the RLC layer, the MAC layer, and a PHY layer) below the PDCP layer.

The division based on the protocol layer is merely an example, and division may alternatively be performed based on another protocol layer such as the RLC layer. Functions of the RLC layer and a protocol layer above the RLC layer are set on the CU, and a function of a protocol layer below the RLC layer is set on the DU. Alternatively, division is performed at a protocol layer. For example, some functions of the RLC layer and a function of a protocol layer above the RLC layer are set on the CU, and a remaining function of the RLC layer and a function of a protocol layer below the RLC layer are set on the DU. In addition, division may alternatively be performed in another manner. For example, division is performed based on a latency. A function whose processing time needs to satisfy a latency requirement is set on the DU, and a function whose processing time does not need to satisfy the latency requirement is set on the CU.

Figure 3:
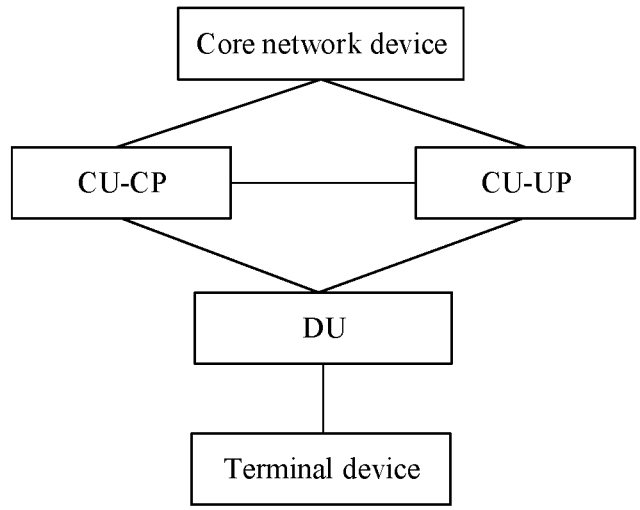
FIG. 3 is another schematic diagram of a structure of an access network device according to this application.

FIG. 3 is another schematic diagram of a network architecture to which an embodiment of this application is applicable. Compared with that in the architecture shown in FIG. 2, a control plane (CP) and a user plane (UP) of a CU may be separated and implemented by using different entities. The different entities are respectively a control plane CU entity (CU-CP entity) and a user plane CU entity (CU-UP entity).

In the foregoing network architecture, signaling generated by the CU may be sent to a terminal device by using the DU, or signaling generated by a terminal device may be sent to the CU by using the DU. The DU may transparently transmit the signaling to the terminal device or the CU by directly encapsulating the signaling at a protocol layer without parsing the signaling. In the following embodiments, if transmission of such signaling between the DU and the terminal device is involved, sending or receiving of the signaling by the DU includes this scenario. For example, signaling of an RRC layer or a PDCP layer is finally processed as signaling of a PHY layer and sent to the terminal device, or signaling of an RRC layer or a PDCP layer is converted from received signaling of a PHY layer. In this architecture, the signaling of the RRC layer or the PDCP layer may also be considered as being sent by the DU, or sent by the DU and a radio frequency.

In the foregoing embodiment, the CU is classified into a network device on a RAN side. In addition, the CU may be alternatively classified into a network device on a CN side. This is not limited herein.

Figure 4:
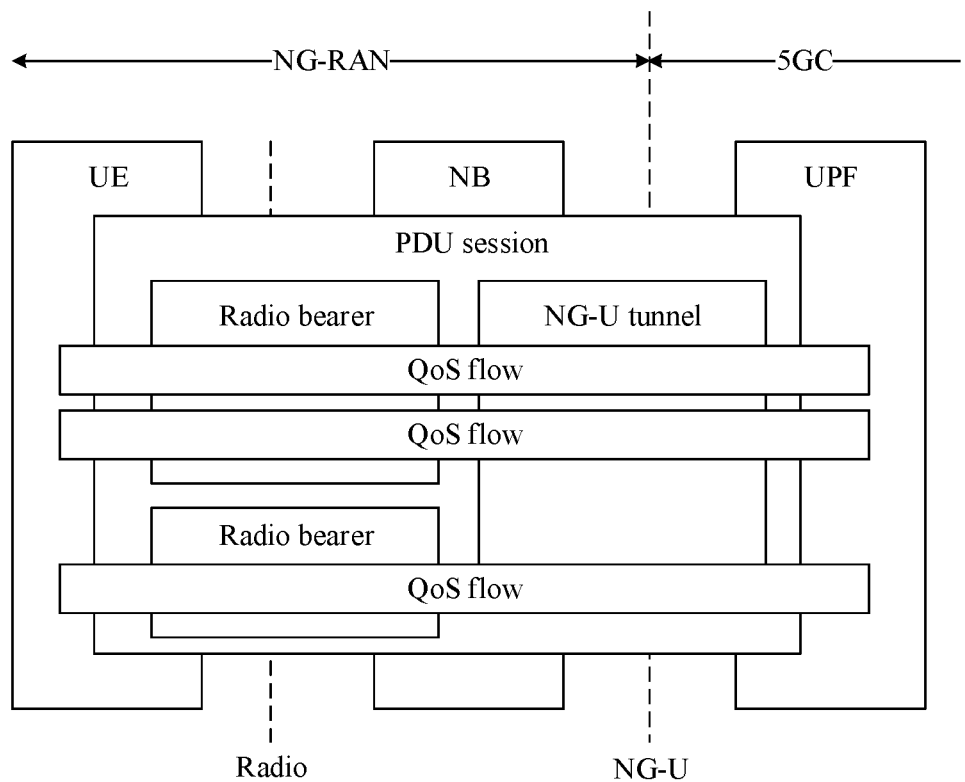
FIG. 4 is a schematic diagram of a QoS architecture.

FIG. 4 is a schematic diagram of a quality of service (quality of service, QoS) flow (flow)-based QoS architecture in a 5G scenario. An example in which a terminal device is UE, a RAN device is a gNB, and a 5GC includes a UPF is used for description. This architecture applies to both NR and E-UTRA connections to the 5GC. As shown in FIG. 4, for each UE, the 5GC establishes one or more PDU sessions (sessions) for the UE. A PDU session may be understood as a link that provides a PDU link service between the UE and a data network (data network, DN). For each UE, an NG-RAN establishes one or more data radio bearers (data radio bearers, DRBs) for each PDU session. A DRB may be understood as a data bearer between an NB and the UE. Data packets in the data bearer have same forwarding processing.

As shown in FIG. 4, a DRB may transmit or carry one or more QoS flows. A QoS flow is a data flow that has a same QoS requirement in a PDU session. The QoS flow is a minimum granularity of QoS differentiation in a PDU session.

Transmission between the NB and the UE may be referred to as an access stratum (access stratum, AS), and transmission between the UE and the 5GC may be referred to as a non-access stratum (non-access stratum, NAS). In the QoS flow-based QoS architecture, QoS flow mapping of an AS and a NAS is mainly included. The NAS layer is mainly responsible for a mapping relationship between an IP flow or another type of data packet and a QoS flow. The UPF in the core network generates a downlink QoS flow, and the terminal generates an uplink QoS flow. The AS layer is mainly responsible for a mapping relationship between a QoS flow and a DRB. A network side (for example, a base station) configures the mapping relationship between a QoS flow and a DRB, and provides a QoS service for the QoS flow on a DRB of an air interface.

In this embodiment of this application, DRBs in MR-DC are classified into a master cell group (master cell group, MCG) bearer (bearer), a secondary cell group (secondary cell group, SCG) bearer, and a split (split) bearer. The MCG bearer means that an RLC/MAC entity of the DRB is located only on an MN, the SCG bearer means that an RLC/MAC entity of the DRB is located only on an SN, and the split bearer means that an RLC/MAC entity of the DRB is located on both the MN and the SN.

Figure 5:
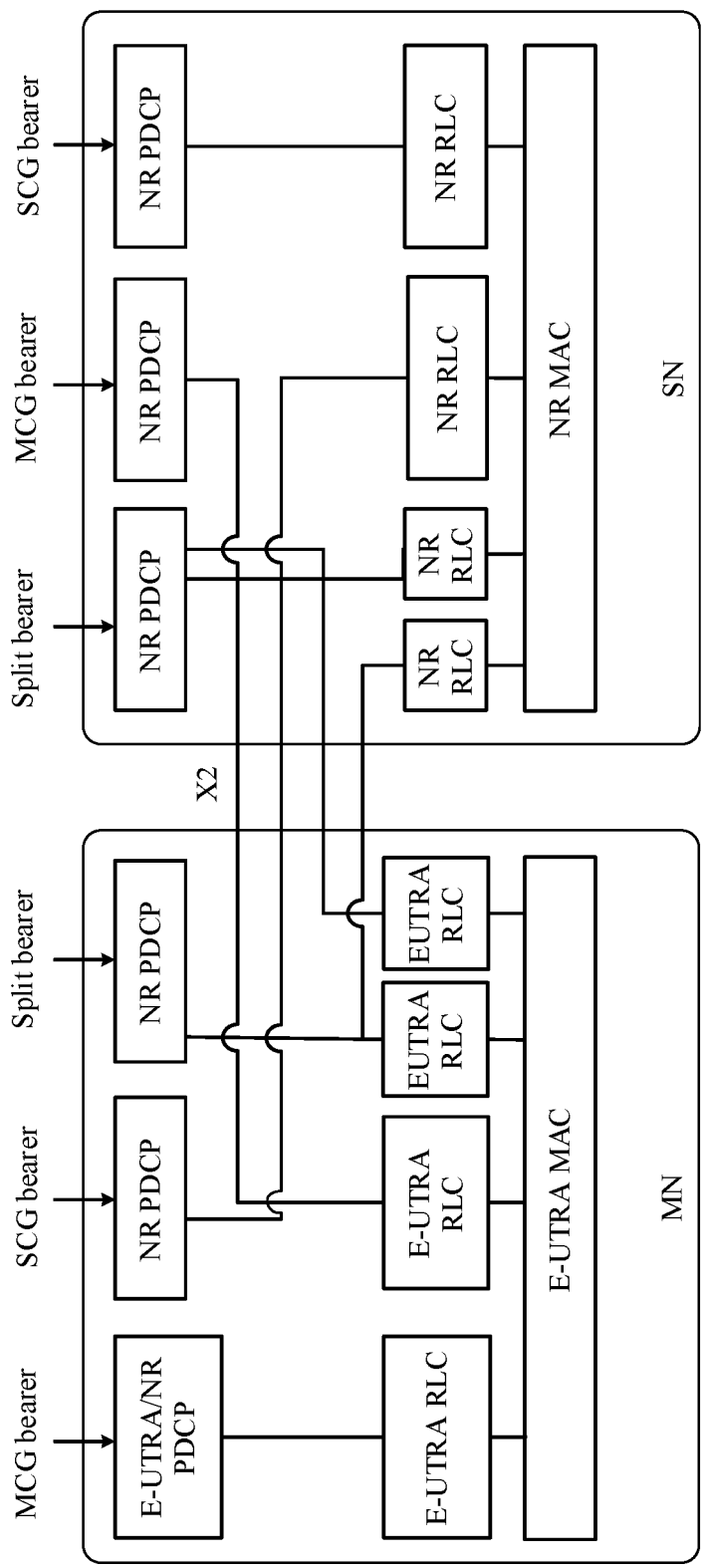
FIG. 5 is a schematic diagram of a protocol stack of a bearer.

FIG. 5 is a schematic diagram of protocol stacks of an MCG bearer, an SCG bearer, and a split bearer on a network side in EN-DC. An MN and an SN have different RLC/MAC entities. For an MCG bearer on the MN, data is transmitted between an RLC/MAC entity on the MN and a terminal device. For an MCG bearer on the SN, data is transmitted between the RLC/MAC entity on the MN and the terminal device. For an SCG bearer on the MN, data is transmitted between an RLC/MAC entity on the SN and the terminal device. For an SCG bearer on the SN, data is transmitted between the RLC/MAC entity on the SN and the terminal device. For a split bearer on the MN, data may be transmitted between the RLC/MAC entity on the MN and the terminal device, or may be transmitted between the RLC/MAC entity on the SN and the terminal device. For a split bearer on the SN, data may be transmitted between the RLC/MAC entity on the MN and the terminal device, or may be transmitted between the RLC/MAC entity on the SN and the terminal device.

A bearer (bearer) for which a PDCP is terminated at the MN is referred to as an MN terminated bearer. To be specific, downlink (downlink, DL) data directly arrives at the MN from a core network, is processed by the PDCP/an SDAP of the MN, and then is sent to the terminal device by using the RLC/MAC of the MN or/and the SN. Uplink (uplink, UL) data is processed by the PDCP/SDAP of the MN and then sent to the core network. Similarly, a bearer for which a PDCP is terminated at the SN is referred to as an SN terminated bearer. To be specific, DL data directly arrives at the SN from the core network, is processed by the PDCP/an SDAP of the SN, and then is sent to the terminal device by using the RLC/MAC of the MN or/and the SN. UL data is processed by the PDCP/SDAP of the SN and then sent to the core network.

In addition, in MR-DC, both the MN and the SN have an RRC entity, and both can generate an RRC message (that is, a control message, for example, a measurement message). In a possible implementation, the SN may directly send, to the terminal device, the RRC message generated by the SN. In this case, the RRC message sent by the terminal device to the SN is also directly sent to the SN. In this case, the RRC message between the SN and the terminal device is transmitted through a signaling radio bearer (Signaling Radio Bearer, SRB) 3, or the RRC message is carried in the SRB 3. In another possible implementation, the RRC message generated by the SN may be sent to the MN, and then the MN sends the RRC message to the terminal device. In this case, the terminal device forwards, to the SN by using the MN, RRC messages sent to the SN. To be specific, the terminal device sends these RRC messages to the MN, and then the MN forwards the messages to the SN.

An apparatus in the following embodiments of this application may be located in a terminal device, an MN, or an SN based on a function implemented by the apparatus. When the foregoing CU-DU structure is used, the MN may be a CU node, a DU node, or a RAN device including a CU node and a DU node, and the SN may be a CU node, a DU node, or a RAN device including a CU node and a DU node.

It should be understood that the foregoing FIG. 1 to FIG. 5 are merely examples for description, but shall not constitute any limitation on this application. For example, in a communication system, a core network device may be connected to a plurality of access network devices, configured to control the access network devices, and can distribute data received from a network side (for example, the Internet) to the access network devices.

For some streaming services, voice services, or other services, such as a streaming service or an IP MTSI service, signal quality alone cannot reflect experience of a user when the user uses these services. In this case, a carrier may learn of user experience through QoE measurement collection, to better optimize a network to improve user experience.

Figure 6:
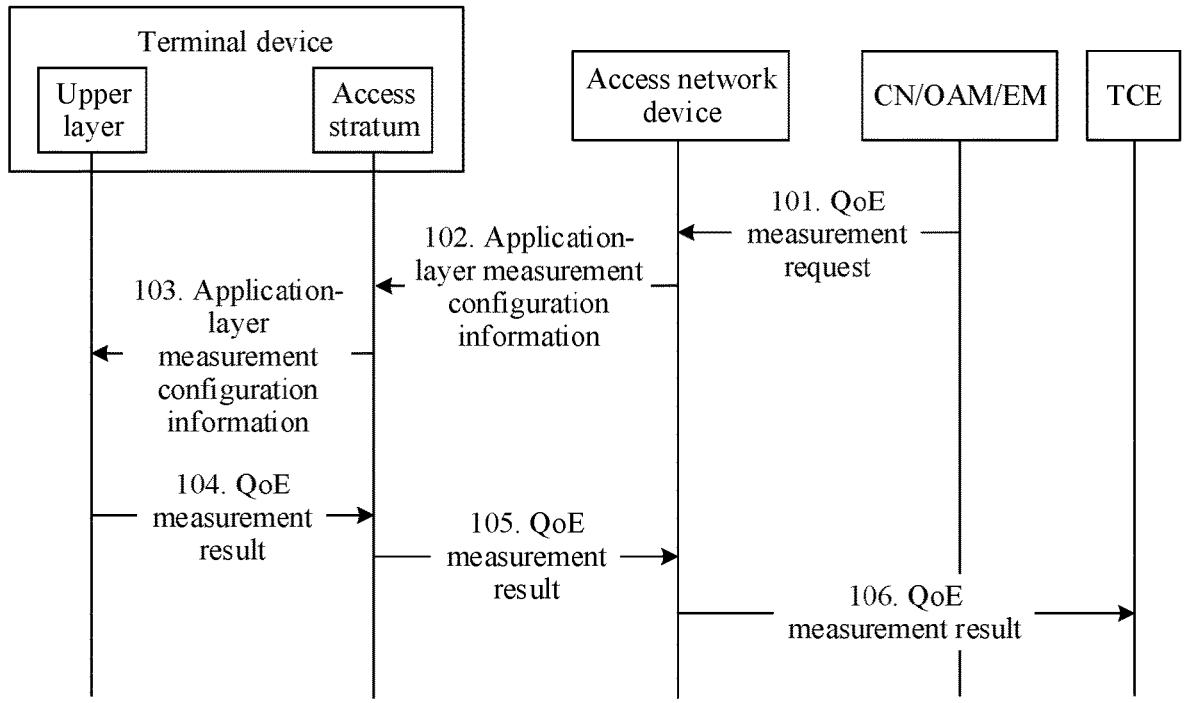
FIG. 6 is a schematic flowchart of a QoE measurement method.

FIG. 6 is a schematic flowchart of a QoE measurement method. As shown in FIG. 6, the QoE measurement method includes steps 101 to 106.

101. A CN, an OAM, or an element manager (element manager, EM) sends a QoE measurement request to an access network device, where the QoE measurement request includes QoE measurement configuration information. Correspondingly, the access network device receives the QoE measurement request. The QoE measurement configuration information in the QoE measurement request indicates a terminal device to perform application-layer QoE measurement, for example, indicates the terminal device to start the application-layer QoE measurement.

In some implementations, when the QoE measurement is initiated through signaling-based (signaling-based) minimization of drive tests (minimization of drive tests, MDT), that is, the QoE measurement is signaling-based QoE measurement, the CN sends the QoE measurement configuration information to the access network device. Correspondingly, the access network device receives the QoE measurement configuration information from the CN. In a possible implementation, the CN may notify the QoE measurement configuration information for a specific terminal device. For example, the QoE measurement configuration information may be sent in an interface message that is between the access network device and the CN and that is for the specific terminal device. For example, an initial contextsetup message (initial context setup message), a trace start message (trace start message), or a handover request message (handover request message) sent by the CN to the access network device for the specific terminal device carries the QoE measurement configuration information.

In some implementations, when the QoE measurement is initiated through management-based (management-based) MDT, that is, the QoE measurement is management-based QoE measurement, the OAM or the EM sends the QoE measurement configuration information to the access network device. Correspondingly, the access network device receives the QoE measurement configuration information from the OAM or the EM. It should be noted that the QoE measurement configuration information herein is not QoE measurement configuration information for a specific terminal device, in other words, the QoE measurement configuration information received by the access network device from the OAM or the EM does not specify a terminal device for which measurement is performed.

In an example, the QoE measurement configuration information may be shown in the following Table 1:

TABLE 1

| IE/group name (IE/group name) | Presence (presence) | Range (range) | IE type and reference (IE type and reference) | Semantics description (semantics description) | Criticality (criticality) | Assigned criticality (assigned criticality) |
| --- | --- | --- | --- | --- | --- | --- |
| Application-layer measurement configuration container | Mandatory (M) | | Octet string (1 . . . 1000) | Indicates an application-layer measurement configuration. For details, see annex L in 3GPP TS 26.247 or section 16.5 in 3GPP TS 26.114. | — | — |

TABLE 1-continued

| IE/group name (IE/group name) | Presence (presence) | Range (range) | IE type and reference (IE type and reference) | Semantics description (semantics description) | Criticality (criticality) | Assigned criticality (assigned criticality) |
|---|---|---|---|---|---|---|
| QoE measurement collection area scope choice (CHOICE Area Scope of QMC) | M | | | | — | — |
| >Cell-based (Cell based) | | | | | — | |
| >>Cell list for QMC (Cell ID List for QMC) | | 1 . . . <maxnoof CellIDfor QMC> | | | — | |
| >>>Cell global identifier (cell global identifier, CGI) | M | | | Public land mobile network (public land mobile network, PLMN) identifier and cell identifier | — | — |
| >Tracking area-based (Tracking area based, TA-based) | | | | | | |
| >>Tracking area list for QMC (TA List for QMC) | | 1 . . . <maxnoof TAforQMC> | | | — | |
| >>>Tracking area code (Tracking Area Code, TAC) | M | | Octet string (2) | | — | — |
| >Tracking area identity-based (TAI based) | | | | | — | |
| >>Tracking area identity list for QMC (TAI List for QMC) | | 1 . . . <maxnoof TAforQMC> | | | — | — |
| >>>Tracking area identity (TAI) | M | | PLMN and Tracking area code | | — | — |
| >PLMN area-based (PLMN area based) | | | | | | — |
| >>PLMN list for QMC (PLMN List for QMC) | | 1 . . . <maxnoof PLMNfor QMC> | | | | — |
| >>>PLMN identity (PLMN Identity) | M | | Octet string (3) | | — | — |
| Service type (Service Type) | M | | Enumerated type (QMC for streaming service (QMC for streaming service) and QMC for MTSI service (QMC for MTSI service)) | | — | — |

(1 . . . 1000) indicates a value range of the octet string.

In Table 1, the QoE measurement collection area scope choices may be a cell-based QoE measurement collection area scope, a TA-based QoE measurement collection area scope, a TAI-based QoE measurement collection area scope, and a PLMN area-based QoE measurement collection area scope respectively. The cell-based QoE measurement collection area scope may carry a cell list for QMC. <maxnoofCellIDforQMC> indicates that there may be a plurality of cell lists. Each cell list includes a global cell identifier (that is, content in a row below the cell list). The TA-based QoE measurement collection area scope may carry a TA list for QMC. <maxnoofTAforQMC> indicates that there may be a plurality of TA lists. Each TA list includes a TAC (that is, content in a row below the TA list). The TAI-based QoE measurement collection area scope may carry a TAI list for QMC. <maxnoofTAforQMC> indicates that there may be a plurality of TAI lists. Each TAI list includes a TAI (that is, content in a row below the TAI list). The PLMN area-based QoE measurement collection area scope may carry a PLMN list for QMC. <maxnoofPLMNforQMC> indicates that there may be a plurality of PLMN lists. Each PLMN list includes a PLMN identity (that is, content in a row below the PLMN list).

When the QoE measurement configuration information includes the area scopes of QoE measurement in Table 1, the access network device delivers the QoE measurement configuration information to the terminal device, the access network device requests the terminal device to report a QoE measurement result, or the access network device requests the terminal device to perform the QoE measurement, only when the terminal device is located in these areas.

It should be noted that, in Table 1, the application-layer measurement configuration container in the QoE measurement configuration information is transparent to the access network device. In other words, the access network device cannot perceive information content included in the application-layer measurement configuration container. Information included in the application-layer measurement configuration container may be referred to as application-layer measurement configuration information (or an application-layer measurement configuration). In another implementation, the application-layer measurement configuration container may alternatively carry information content in a form that can be perceived by the access network device. This is not limited in this application.

It should be noted that, in this embodiment, an example in which the CN, the OAM, or the EM sends the QoE measurement request to the access network device is used. Alternatively, another network device may send the QoE measurement request to the access network device, or the access network device may trigger the QoE measurement based on a requirement of the access network device. This is not limited in this application.

102. The access network device sends the application-layer measurement configuration information to an access stratum of the terminal device.

For example, the access network device may send the application-layer measurement configuration information to the access stratum of the terminal device by using an RRC message.

Optionally, the access network device further sends, to the access stratum of the terminal device, a service type corresponding to the QoE measurement.

103. The access stratum of the terminal device sends the application-layer measurement configuration information to an upper layer of the access stratum.

Optionally, the access stratum of the terminal device further sends, to the upper layer of the access stratum, the service type corresponding to the QoE measurement.

For example, the upper layer of the access stratum may be an application (application, APP) layer, or a layer between an application layer and the access stratum. This is not limited in this embodiment of this application.

It should be noted that the access stratum of the terminal device is a function layer for communication between the terminal device and the access network device. For example, the access stratum may include at least one of an RRC layer, a PDCP layer, and an SDAP layer. Optionally, the access stratum may further include at least one of an RLC layer, a MAC layer, and a PHY layer. For example, the RRC layer of the terminal device may receive the application-layer measurement configuration information and the service type, and send the application-layer measurement configuration information and the service type to an upper layer of the RRC layer.

104. The upper layer sends the QoE measurement result to the access stratum.

For example, when the upper layer is the application layer, the application layer may perform the QoE measurement based on the received application-layer measurement configuration information, and obtain the QoE measurement result. Then, the application layer may send the QoE measurement result to the access stratum of the terminal device. When the upper layer is another layer, the another layer may perform the QoE measurement based on the received application-layer measurement configuration information, and obtain the QoE measurement result. The application layer sends the QoE measurement result to the another layer, and then the another layer may send the QoE measurement result to the access stratum of the terminal device.

In some implementations, the upper layer may send, to the access stratum, the QoE measurement result together with the service type corresponding to the QoE measurement result. Herein, when the application layer performs the QoE measurement based on the application-layer measurement configuration information to obtain the QoE measurement result, a service type corresponding to the application-layer measurement configuration information is the service type corresponding to the QoE measurement result.

105. The access stratum of the terminal device sends the QoE measurement result to the access network device.

For example, the access stratum may encapsulate the QoE measurement result in a transparent container and send the transparent container to the access network device.

In some optional implementations, when receiving the QoE measurement result and the service type corresponding to the QoE measurement result, the access stratum may send, to the access network device, the QoE measurement result together with the service type corresponding to the QoE measurement result (for example, by including them in a same RRC message).

It should be noted that an access network device that sends the application-layer measurement configuration information and an access network device that receives the QoE measurement result may not be a same access network device, or may be a same access network device. This is not limited in this embodiment of this application. For example, when the terminal device hands over a serving access network device due to mobility of the terminal device, the two access network devices are not a same access network device.

106. The access network device sends the QoE measurement result to a trace collection entity (trace collection entity, TCE).

For example, before step 102, for example, in step 101, the QoE measurement request may include a TCE ID. In this way, the access network device may determine a TCE IP address based on a mapping relationship between a TCE ID and a TCE IP address, and send the QoE measurement result to a TCE corresponding to the TCE IP address.

For another example, before step 102, for example, in step 101, the QoE measurement request may include a TCE IP. In this way, the access network device may send, based on a TCE IP address, the QoE measurement result to a TCE corresponding to the TCE IP address.

A QoE measurement process may be completed by using the foregoing steps 101 to 106.

Figure 7:
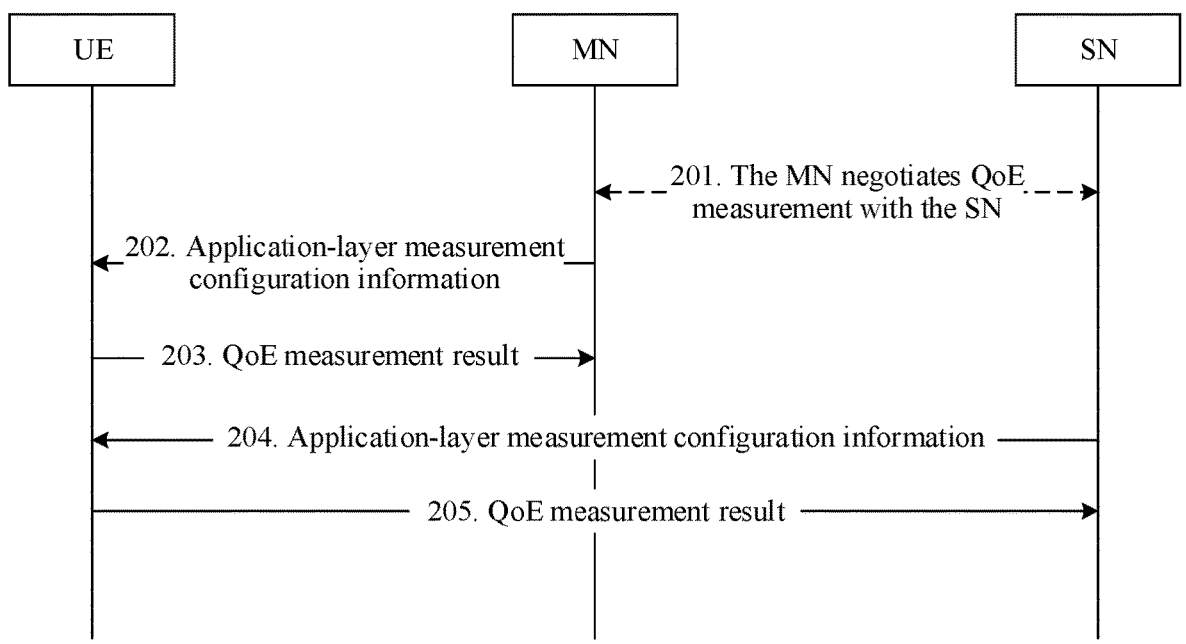
FIG. 7 is a schematic flowchart of another QoE measurement method.

In an MR-DC architecture, both an MN and an SN may deliver the application-layer measurement configuration information to the terminal device. After obtaining the QoE measurement result based on the application-layer measurement configuration information, the terminal device may send the QoE measurement result to a corresponding base station. FIG. 7 is a schematic flowchart of a method for performing QoE measurement in MR-DC. The method includes steps 201 to 205.

Before step 201, a CN/an OAM/an EM may send QoE measurement configuration information to an access network device. In a possible case, the CN/OAM/EM may send the QoE measurement configuration information to an MN in the MR-DC. In another possible case, the CN/OAM/EM sends the QoE measurement configuration information to the MN in the MR-DC, and then the MN sends the QoE measurement configuration information (which may be some information in the QoE measurement configuration information received by the MN, or may be all information in the QoE measurement configuration information received by the MN) to an SN. In this case, it may be considered that an access network device that receives the QoE measurement configuration information is the SN.

201. The MN negotiates QoE measurement with the SN.

For example, the MN may query whether the SN can configure QoE measurement for UE (or whether the SN can deliver application-layer measurement configuration information to the UE), the MN may notify the SN that the MN configures the QoE measurement for the UE (or the MN delivers the application-layer measurement configuration information to the UE), the SN may notify the MN that the SN configures the QoE measurement for the UE (or the SN delivers the application-layer measurement configuration information to the UE), or the like. This is not limited in this embodiment of this application.

In some implementations, the MN and the SN may separately deliver the application-layer measurement configuration information to the UE. In this case, the MN and the SN may negotiate a service type of the QoE measurement. For example, the MN may notify the SN that the MN configures QoE measurement of a first service type (service type) for the UE, or indicate the SN that the SN configures QoE measurement of a second service type for the UE.

In some optional implementations, the MN may send the application-layer measurement configuration information to the UE. Correspondingly, the UE sends a QoE measurement result to the MN. For details, refer to the following steps 202 and 203.

202. The MN sends the application-layer measurement configuration information to the UE, where the application-layer measurement configuration information indicates the UE to perform application-layer QoE measurement, for example, indicates the terminal device to start the application-layer QoE measurement. Specifically, for the application-layer measurement configuration information, refer to descriptions in FIG. 1 and Table 1. Details are not described again.

203. The UE sends the QoE measurement result to the MN. The QoE measurement result is obtained by the UE by performing the QoE measurement based on the application-layer measurement configuration information in step 202.

In some optional implementations, the SN may send the application-layer measurement configuration information to the UE. Correspondingly, the UE may send the QoE measurement result to the SN. For details, refer to the following steps 204 and 205.

204. The SN sends the application-layer measurement configuration information to the UE, where the application-layer measurement configuration information indicates the UE to perform application-layer QoE measurement, for example, indicates the terminal device to start the application-layer QoE measurement. Specifically, for the application-layer measurement configuration information, refer to descriptions in FIG. 1 and Table 1. Details are not described again.

205. The UE sends the QoE measurement result to the SN. The QoE measurement result is obtained by the UE by performing the QoE measurement based on the application-layer measurement configuration information in step 204.

In a possible implementation, in step 204, the SN may send, to the MN, an RRC message (to be specific, an RRC message between the SN and the UE, including the application-layer measurement configuration information) that needs to be sent to the UE, and then the MN encapsulates the RRC message between the UE and the SN into an RRC message between the MN and the UE.

Correspondingly, in step 205, the UE may encapsulate, into an RRC message sent by the UE to the MN, an RRC message (to be specific, the RRC message between the SN and the UE, including the QoE measurement result) that needs to be sent to the SN, and send the RRC message to the MN. After receiving the RRC message, the MN may send the RRC message between the UE and the SN to the SN.

In another possible implementation, in step 204, the SN may directly send the application-layer measurement configuration information to the UE through an SRB 3. Correspondingly, in step 205, the UE may directly send the QoE measurement result to the SN through the SRB 3.

However, in DC communication, if an access stratum of a terminal device cannot determine, after obtaining a QoE measurement result from an upper layer of the access stratum, whether the measurement result is a measurement result corresponding to measurement configuration information delivered by an MN or a measurement result corresponding to measurement configuration information delivered by an SN, the terminal device sends the QoE measurement result to an incorrect access network device, and thus the access network device mistakenly considers that the QoE measurement result belongs to the access network device. Consequently, a subsequent processing result (for example, the access network device optimizes network configuration or adjusts resource allocation of the terminal device) based on the QoE measurement result is inaccurate. Alternatively, the access network device may send the QoE measurement result to another network device (for example, a TCE). If the terminal device sends the QoE measurement result to an incorrect access network device and the access network device sends the QoE measurement result to the TCE, the TCE mistakenly considers that the QoE belongs to a QoE measurement result of the TCE or mistakenly considers that the QoE comes from a QoE measurement result corresponding to the incorrect access network device. Consequently, a subsequent processing result based on the QoE measurement result is inaccurate.

Embodiments of this application provide a communication solution. In this solution, an access stratum of a terminal device may receive, from an upper layer of the access stratum, a QoE measurement result and indication information corresponding to the QoE measurement result, so that the access stratum can determine, based on the indication information, to send the QoE measurement result to an access network device in DC communication, for example, an MN or an SN.

The following describes in detail a communication method and a communication apparatus provided in this application with reference to the accompanying drawings.

The technical solutions of this application may be applied to a wireless communication system, for example, the communication system shown in FIG. 1, the communication system shown in FIG. 2, or the communication system shown in FIG. 3. There may be a wireless communication connection relationship between communication apparatuses in the wireless communication system. One apparatus in the communication apparatus may be, for example, a master node or a chip configured in the master node. Another apparatus may be, for example, a secondary node or a chip configured in the secondary node. Another apparatus may be, for example, a terminal device or a chip configured in the terminal device. This is not limited in embodiments of this application.

Without loss of generality, embodiments of this application are first described in detail by using a communication process of a terminal device as an example. It may be understood that any terminal device in the wireless communication system or a chip configured in the terminal device may perform communication based on a same method, any master node in the wireless communication system or a chip configured in the master node may perform communication based on a same method, and any secondary node in the wireless communication system or a chip configured in the secondary node may perform communication based on a same method. This is not limited in this application.

The following uses an example in which the master node is an MN and the secondary node is an SN for description. However, this constitutes no limitation on embodiments of this application.

Figure 8:
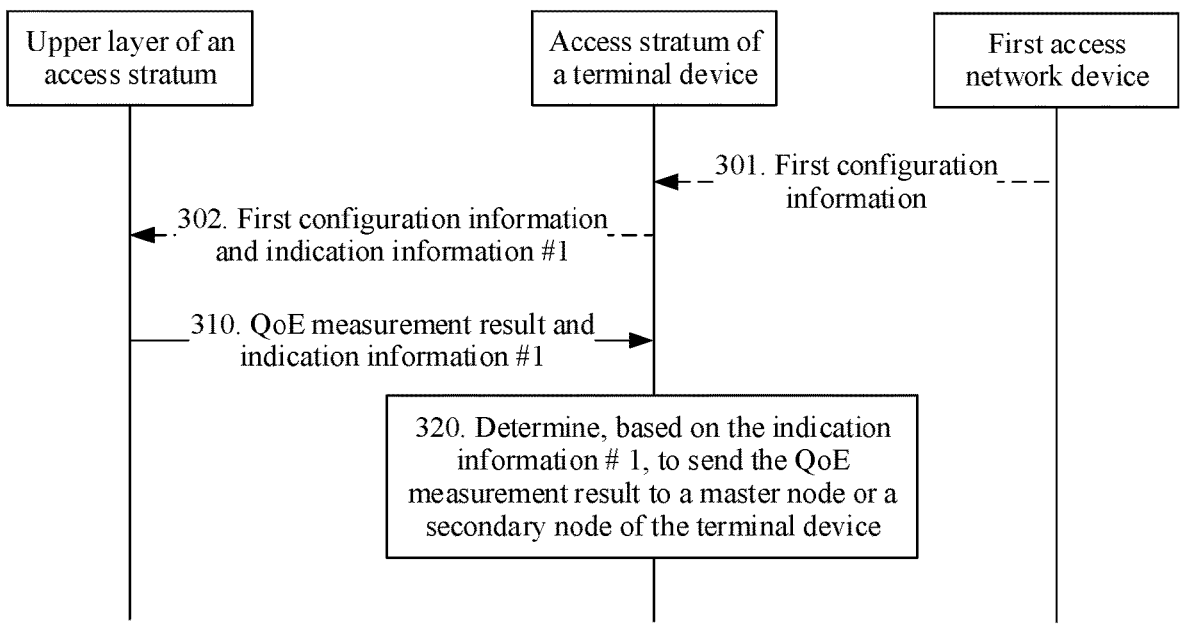
FIG. 8 is a schematic flowchart of a communication method according to an embodiment of this application.

FIG. 8 is a schematic flowchart of a communication method 300 according to an embodiment of this application. In the method 300, an access stratum of a terminal device receives a QoE measurement result and indication information #1 from an upper layer of the access stratum, and determines, based on the indication information #1, to send the QoE measurement result to an MN or an SN. As shown in FIG. 8, the method 300 includes steps 310 and 320.

310. The access stratum of the terminal device receives the quality of experience QoE measurement result and the indication information #1 from the upper layer of the access stratum.

Herein, the terminal device may determine, based on the indication information #1, to send the QoE measurement result to the MN or the SN of the terminal device.

In a possible implementation, the indication information #1 may explicitly indicate to "send the QoE measurement result to the MN of the terminal device" or "send the QoE measurement result to the SN of the terminal device". For example, the indication information #1 may be a 1-bit (bit) indication bit. When a value of the indication bit is "0", the indication information #1 may indicate to send the QoE measurement result to the MN of the terminal device; or when a value of the indication bit is "1", the indication information #1 may indicate to send the QoE measurement result to the SN of the terminal device; or vice versa.

In another possible implementation, the indication information #1 may implicitly indicate to "send the QoE measurement result to the MN of the terminal device" or "send the QoE measurement result to the SN of the terminal device". For example, when the indication information #1 is a first QoE service type, the indication information #1 may indicate to send the QoE measurement result to the MN of the terminal device. When the indication information #1 is a second QoE service type, the indication information #1 may indicate to send the QoE measurement result to the SN of the terminal device. In other words, a QoE service type may indicate a service type of QoE measurement. When the QoE measurement result is reported, the terminal device may further determine, based on the QoE service type, whether to send the QoE measurement result to the MN or the SN.

In some implementations, when time at which an application layer of the terminal device performs the QoE measurement based on at least two pieces of application-layer measurement configuration information overlaps, or periodicities of reporting QoE measurement corresponding to the at least two pieces of application-layer measurement configuration information overlap, when receiving the QoE measurement result from the upper layer, the access stratum of the terminal device may not be capable of learning of a specific piece of application-layer measurement configuration information to which the QoE measurement result corresponds, and thus may not be capable of determining whether to send the QoE measurement result to the MN or the SN. In this case, if the access stratum can receive the indication information #1 corresponding to the QoE measurement result, the terminal device may determine, based on the indication information #1, whether to send the QoE measurement result to the MN or the SN.

Alternatively, in some implementations, even if the application layer of the terminal device receives only one piece of application-layer measurement configuration information, to be compatible with a scenario in which at least two pieces of application-layer measurement configuration information are subsequently extended to perform the QoE measurement, the access stratum may be enabled to receive the indication information #1 corresponding to the QoE measurement result, and determine, based on the indication information #1, whether to send the QoE measurement result to the MN or the SN.

In an example, the indication information #1 may include at least one of a trace identifier (trace ID), a TCE ID, QoE service type information, node type (node type) information, RAT type (type) information, a PDU session identifier (PDU session ID), a 5G quality of service identifier (5G QoS identifier, 5QI), a quality of service flow identifier (QoS Flow identifier, QFI), and a first identifier, where the first identifier is allocated by an OAM or an access network device. The node type information may indicate the MN or the SN. In a specific example, the first identifier may be a base station identifier or a measurement task identifier. This is not limited in this embodiment of this application.

For example, when the indication information #1 includes a trace ID corresponding to an application-layer measurement configuration delivered by the MN, a TCE ID corresponding to the application-layer measurement configuration delivered by the MN, a service type corresponding to the application-layer measurement configuration delivered by the MN, node type information of the MN, a PDU session identifier corresponding to data transmitted on an MN terminated bearer, a QFI corresponding to data transmitted on a bearer for which a PDCP is terminated at the MN, an identifier allocated by the MN, or an identifier allocated by an OAM to the application-layer measurement configuration delivered by the MN, the indication information #1 may indicate to send the QoE measurement result to the MN.

For another example, when the indication information #1 includes a trace ID corresponding to an application-layer measurement configuration delivered by the SN, a TCE ID corresponding to the application-layer measurement configuration delivered by the SN, a service type corresponding to the application-layer measurement configuration delivered by the SN, node type information of the SN, a PDU session identifier corresponding to data transmitted on a bearer for which a PDCP is terminated at the SN, a QFI corresponding to the data transmitted on the bearer for which a PDCP is terminated at the SN, an identifier allocated by the SN, or an identifier allocated by an OAM to the application-layer measurement configuration delivered by the SN, the indication information #1 may indicate to send the QoE measurement result to the SN.

In some implementations, the indication information #1 may be determined by the upper layer of the access stratum, for example, determined based on application-layer measurement configuration information indicating the terminal device to perform QoE measurement, or related information (for example, QoE service type information) delivered together with the application-layer measurement configuration information. Alternatively, the indication information #1 may be received (for example, by using steps 301 and 302 below) by the upper layer of the access stratum from the access stratum of the terminal device. This is not limited in this embodiment of this application.

In some optional implementations, before step 310, steps 301 and 302 may be further included.

301. A first access network device sends first configuration information to the access stratum of the terminal device, where the first configuration information indicates the terminal device to perform application-layer QoE measurement.

The first access network device may be the MN or the SN of the terminal device. This is not limited in this embodiment of this application. In other words, the MN may send the first configuration information to the access stratum of the terminal device, to indicate the terminal device to perform the application-layer QoE measurement, or the SN may send the first configuration information to the access stratum of the terminal device, to indicate the terminal device to perform the application-layer QoE measurement.

In some possible implementations, the SN may further request the MN to send the first configuration information to the terminal device. When sending the first configuration information to the terminal device, the MN may indicate that the first configuration information is from the SN. In this case, it may be considered that the first configuration information is sent by the SN to the access stratum of the terminal device. However, this is not limited in this embodiment of this application.

For example, the first configuration information may be the application-layer measurement configuration information in FIG. 6. This is not limited in this embodiment of this application. For details, refer to the descriptions in FIG. 6. Details are not described again.

In some optional implementations, the first access network device further sends indication information #2 to the access stratum of the terminal device. For example, the indication information #2 may indicate that the first access network device that sends the first configuration information is the MN or the SN. In a specific example, the indication information #2 may include at least one of a trace ID, a TCE ID, QoE service type (service type) information, node type information, RAT type information, a PDU session identifier, a 5G quality of service identifier (5G QoS identifier, 5QI), a quality of service flow identifier (QoS Flow identifier, QFI), and a first identifier, where the first identifier is allocated by an OAM or an access network device. For the first identifier, refer to the foregoing descriptions. Details are not described again.

It should be noted that the terminal device may determine, based on the indication information #2, that the first access network device that sends the first configuration information is the MN or the SN. The indication information #2 may explicitly indicate that the first access network device that sends the first configuration information is the MN, or indicate that the first access network device that sends the first configuration information is the SN. The indication information #2 may alternatively implicitly indicate that the first access network device that sends the first configuration information is the MN, or indicate that the first access network device that sends the first configuration information is the SN. Specifically, for an explicit indication or an implicit indication, refer to the foregoing descriptions of the indication information #1. Details are not described again.

For example, when the indication information #2 includes a trace ID corresponding to an application-layer measurement configuration delivered by the MN, a TCE ID corresponding to the application-layer measurement configuration delivered by the MN, a service type corresponding to the application-layer measurement configuration delivered by the MN, node type information of the MN, a PDU session identifier corresponding to data transmitted on a bearer for which a PDCP is terminated at the MN, a QFI corresponding to the data transmitted on the bearer for which a PDCP is terminated at the MN, an identifier allocated by the MN, or an identifier allocated by an OAM to the application-layer measurement configuration delivered by the MN, the indication information #2 may indicate that the MN sends the first configuration information to the terminal device.

For another example, when the indication information #2 includes a trace ID corresponding to an application-layer measurement configuration delivered by the SN, a TCE ID corresponding to the application-layer measurement configuration delivered by the SN, a service type corresponding to the application-layer measurement configuration delivered by the SN, node type information of the SN, a PDU session identifier corresponding to data transmitted on a bearer for which a PDCP is terminated at the SN, a QFI corresponding to the data transmitted on the bearer for which a PDCP is terminated at the SN, an identifier allocated by the SN, or an identifier allocated by an OAM to the application-layer measurement configuration delivered by the SN, the indication information #2 may indicate that the SN sends the first configuration information to the terminal device.

In some implementations, the MN may include the first configuration information and the indication information #2 in an RRC message, and send the RRC message to the access stratum of the terminal device. In this case, the first configuration information may be encapsulated in the RRC message in a form of a container. Alternatively, the indication information #2 may be encapsulated in the container, or the indication information #2 is included outside the container in the RRC message in a form other than the container. For example, the MN explicitly sends the indication information #2 to the terminal device by using an information element (information element), and an RRC layer of the MN, the SN, or the terminal device can know specific meanings of these information elements.

In some optional implementations, if the indication information #2 is the trace ID, the TCE ID, the QoE service type information, the PDU session identifier, the 5QI, the QFI, or the first identifier, before step 301, the MN and the SN need to exchange respective applicable scopes of the information.

For example, the MN may send, to the SN, an application scope of the trace ID, the TCE ID, the QoE service type information, the PDU session identifier, the 5QI, the QFI, or the first identifier that is applicable to QoE measurement and that is configured by the SN for the terminal device, or the SN may send, to the MN, an application scope of the trace ID, the TCE ID, the QoE service type information, the PDU session identifier, the 5QI, the QFI, or the first identifier that is applicable to QoE measurement and that is configured by the SN for the terminal device. When learning of the application scope of the trace ID, the TCE ID, the QoE service type information, the PDU session identifier, the 5QI, the QFI, or the first identifier that is applicable and that is of the SN, the MN may determine an application scope of the trace ID, the TCE ID, the QoE service type information, the PDU session identifier, the 5QI, the QFI, or the first identifier that is of the MN and that does not overlap that of the SN. In this way, the terminal device can determine, based on at least one of the trace ID, the TCE ID, the QoE service type information, the PDU session identifier, the 5QI, the QFI, the first identifier, or the like, a specific access network device (for example, the MN or the SN) that sends the first configuration information to the terminal device.

In a specific example, when the first configuration information is the application-layer measurement configuration information shown in Table 1, the indication information #2 may be the QoE service type information in Table 1. When a QoE service type corresponding to the application-layer measurement configuration information is QMC of a streaming media service and the MN sends the application-layer measurement configuration information to the terminal device, the indication information #2 may indicate that the first access network device that sends the application-layer measurement configuration information is the MN. When the QoE service type corresponding to the application-layer measurement configuration information is QMC of an MTSI service and the SN sends the application-layer measurement configuration information to the terminal device, the indication information #2 may indicate that the first access network device that sends the QoE measurement configuration information is the SN. In addition, in this example, if QoE service types corresponding to the application-layer measurement configuration information sent by the MN and the SN are the same, the indication information #2 may be at least one of information such as the trace ID, the TCE ID, the PDU session ID, the 5QI, the QFI, or the first identifier. This is not limited in this embodiment of this application.

Optionally, before the first access network device sends the application-layer measurement configuration information, the MN and the SN may interact to determine that a QoE service type of QoE measurement corresponding to the MN is QMC of a streaming media service, and a QoE service type of QoE measurement corresponding to the SN is QMC of an MTSI service.

On the contrary, when the service type corresponding to the application-layer measurement configuration information is QMC of an MTSI service and the MN sends the application-layer measurement configuration information to the terminal device, the indication information #2 may indicate that the first access network device that sends the application-layer measurement configuration information is the MN. When the service type corresponding to the application-layer measurement configuration information is QMC of a streaming media service and the SN sends the application-layer measurement configuration information to the terminal device, the indication information #2 may indicate that the first access network device that sends the application-layer measurement configuration information is the SN. Optionally, before the first access network device sends the application-layer measurement configuration information, the MN and the SN may interact to determine that a service type of application-layer measurement corresponding to the MN is QMC of an MTSI service, and a service type of application-layer measurement corresponding to the SN is QMC of a streaming media service.

302. The access stratum of the terminal device may send the first configuration information and the indication information #1 to the upper layer of the access stratum after receiving the first configuration information sent by the first access network device.

Correspondingly, the upper layer of the access stratum of the terminal device receives the first configuration information and the indication information #1.

For example, after receiving the first configuration information and the indication information #1, the application layer of the terminal device may perform the QoE measurement based on the first configuration information, and obtain the QoE measurement result (in this case, the QoE measurement result may be referred to as a QoE measurement result corresponding to the first configuration information). Then, the application layer may send the QoE measurement result and the indication information #1 to the access stratum of the terminal device. For example, step 310 is performed.

Therefore, the access stratum of the terminal device sends, to the upper layer of the access stratum, the first configuration information and the indication information #1 corresponding to the first configuration information, so that the upper layer can obtain, when obtaining the QoE measurement result based on the first configuration information, the indication information #1 corresponding to the QoE measurement result. Then, the upper layer of the access stratum of the terminal device sends the QoE measurement result and the indication information #1 to the access stratum of the terminal device, so that the access stratum can determine, based on the indication information #1, whether to send the QoE measurement result to the MN or the SN.

In step 302, the access stratum of the terminal device may further determine the indication information #1. For example, the access stratum may determine the indication information #1 based on the indication information #2, or may determine the indication information #1 based on the first configuration information. This is not limited in this embodiment of this application.

In an example, the indication information #2 and the indication information #1 may be a same piece of information. In other words, the indication information #1 and the indication information #2 include same content. For example, when the access stratum of the terminal device receives the indication information #2 sent by the first access network device, the access stratum may send the indication information #2 to the upper layer of the access stratum.

In this way, when the indication information #2 and the indication information #1 are a same piece of information (for example, information a), the information a not only indicates that the first access network device that sends the first configuration information is the MN, but also may indicate the terminal device to send, to the MN, the QoE measurement result obtained by performing the QoE measurement based on the first configuration information. Alternatively, the information a not only indicates that the first access network device that sends the first configuration information is the SN, but also may indicate the terminal device to send, to the SN, the QoE measurement result obtained by performing the QoE measurement based on the first configuration information.

In another example, when the access stratum of the terminal device receives the first configuration information, and can determine (for example, can determine based on the indication information #2, or determine in another manner) that an access network device that sends the first configuration information is the MN or the SN, the terminal device may generate the indication information #1.

For example, when it is determined that the first configuration information is sent by the MN, the indication information #1 may be at least one of a trace ID corresponding to an application-layer measurement configuration delivered by the MN, a TCE ID corresponding to the application-layer measurement configuration delivered by the MN, service type information corresponding to the application-layer measurement configuration delivered by the MN, node type information of the MN, a PDU session identifier corresponding to data transmitted on a bearer for which a PDCP is terminated at the MN, a QFI corresponding to the data transmitted on the bearer for which a PDCP is terminated at the MN, an identifier allocated by the MN, an identifier allocated by an OAM to the application-layer measurement configuration delivered by the MN, or the like, that is, the indication information #1 indicates the terminal device to send, to the MN, the QoE measurement result obtained by performing the QoE measurement based on the first configuration information.

For another example, when it is determined that the first configuration information is sent by the SN, the indication information #1 may be at least one of a trace ID corresponding to an application-layer measurement configuration delivered by the SN, a TCE ID corresponding to the application-layer measurement configuration delivered by the SN, a service type corresponding to the application-layer measurement configuration delivered by the SN, node type information of the SN, a PDU session identifier corresponding to data transmitted on a bearer for which a PDCP is terminated at the SN, a QFI corresponding to the data transmitted on the bearer for which a PDCP is terminated at the SN, an identifier allocated by the SN, an identifier allocated by an OAM to the application-layer measurement configuration delivered by the SN, or the like, that is, the indication information #1 indicates the terminal device to send, to the SN, the QoE measurement result obtained by performing the QoE measurement based on the first configuration information.

Therefore, in this embodiment of this application, the indication information #1 is determined based on the indication information #2, or the indication information #1 is determined depending on whether an access network device that delivers the first configuration information is the MN or the SN, so that the indication information #1 can indicate to send, to the access network device that delivers the first configuration information, the QoE measurement result obtained by performing the QoE measurement based on the first configuration information, to help the terminal device send the QoE measurement result to a correct access network device.

Further, when the indication information #1 and the indication information #2 are the same information, the terminal device does not need to regenerate the indication information #1, to help reduce terminal complexity.

It should be noted that, that the access stratum of the terminal device sends the first configuration information to the upper layer of the access stratum may include that the access stratum directly sends the first configuration information to the upper layer, or may include that the access stratum obtains new configuration information based on the first configuration information, and sends the configuration information to the upper layer. The new configuration information indicates the upper layer to perform the application-layer QoE measurement.

Alternatively, in step 302, after the access stratum of the terminal device receives the first configuration information sent by the first access network device, when the access stratum determines that the first configuration information is sent by the MN, the access stratum may send the first configuration information to the upper layer through a first interface between the access stratum and the upper layer. When the access stratum determines that the first configuration information is sent by the SN, the access stratum may send the first configuration information to the upper layer through a second interface between the access stratum and the upper layer. In this case, in step 302, the access stratum may not need to send the indication information #1 to the upper layer.

Correspondingly, when the upper layer receives the first configuration information from the first interface, when the upper layer obtains the QoE measurement result corresponding to the first configuration information, the upper layer may send the QoE measurement result to the access stratum through the first interface. Correspondingly, when receiving the QoE measurement result from the first interface, the access stratum may determine to send the QoE measurement result to the MN.

When the upper layer receives the first configuration information from the second interface, when the upper layer obtains the QoE measurement result corresponding to the first configuration information, the upper layer may send the QoE measurement result to the access stratum through the second interface. Correspondingly, when receiving the QoE measurement result from the second interface, the access stratum may determine to send the QoE measurement result to the SN.

In some optional implementations, when the upper layer obtains the first configuration information from the first interface, the upper layer may determine that the first configuration information is sent by the MN, or determine to send, to the MN, the QoE measurement result corresponding to the first measurement configuration information. The upper layer may generate the indication information #1 of the QoE measurement result corresponding to the first configuration information, to indicate to send the QoE measurement result to the MN. However, this is not limited in this embodiment of this application.

In some optional implementations, when the upper layer obtains the first configuration information from the second interface, the upper layer may determine that the first configuration information is sent by the SN, or determine to send, to the SN, the QoE measurement result corresponding to the first measurement configuration information. The upper layer may generate the indication information #1 of the QoE measurement result corresponding to the first configuration information, to indicate to send the QoE measurement result to the SN. However, this is not limited in this embodiment of this application.

320. The access stratum of the terminal device determines, based on the indication information #1, to send the QoE measurement result to the MN or the SN of the terminal device.

For example, if the indication information #1 is used by the terminal device to send, to the MN, the QoE measurement result obtained by performing the QoE measurement based on the first configuration information, the access stratum may determine, based on the indication information #1, to send the QoE measurement result to the MN.

If the indication information #1 indicates the terminal device to send, to the SN, the QoE measurement result obtained by performing the QoE measurement based on the first configuration information, the access stratum may determine, based on the indication information #1, to send the QoE measurement result to the SN.

For example, when the indication information #1 implicitly indicates to "send the QoE measurement result to the MN of the terminal device" or "send the QoE measurement result to the SN of the terminal device", for example, when the indication information #1 is a service type, if the service type is a service type corresponding to the application-layer measurement configuration delivered by the MN, the access stratum of the terminal device determines, based on the indication information #1, to send the QoE measurement result to the MN. If the service type is a service type corresponding to the application-layer measurement configuration delivered by the SN, the access stratum of the terminal device determines, based on the indication information #1, to send the QoE measurement result to the SN.

In a specific example, when it is determined through negotiation between the MN and the SN that the MN configures the terminal device to perform QoE measurement of QMC of a streaming media service, and the SN configures the terminal device to perform QoE measurement of QMC of an MTSI service, when the indication information #1 indicates that a service type of the QMC is the streaming media service, the access stratum of the terminal device determines, based on the indication information #1, to send the QoE measurement result to the MN; or when the indication information #1 indicates that the service type of the QMC is the MTSI service, the access stratum of the terminal device determines, based on the indication information #1, to send the QoE measurement result to the SN.

Alternatively, in step 320, when receiving the QoE measurement result through the first interface described above, the access stratum of the terminal device may determine to send the QoE measurement result to the MN; or when receiving the QoE measurement result through the second interface described above, the access stratum of the terminal device may determine to send the QoE measurement result to the SN.

It should be noted that the first access network device that sends the first configuration information and an access network device (the MN or the SN of the terminal device) to which the terminal device reports the QoE measurement result corresponding to the first configuration information may not be a same access network device, or may be a same access network device. This is not limited in this embodiment of this application. For example, when the terminal device hands over a serving access network device due to mobility of the terminal device, the two access network devices are not a same access network device.

Optionally, when the terminal device needs to report the QoE measurement result, if the terminal device is not in an MR-DC state (for example, a network side releases the SN of the terminal device), the terminal device sends the QoE measurement result to an access network device that provides a service for the terminal device. Optionally, when the first access network device delivers the first configuration information, the terminal device is not in the MR-DC state (in other words, the network side does not configure MR-DC for the terminal device). However, when the terminal device needs to report the QoE measurement result, if the terminal device is in the MR-DC state (for example, the network side configures the MR-DC for the terminal device), the terminal device may send the QoE measurement result to the MN, or the terminal device may send the QoE measurement result to a node (for example, the MN or the SN) that currently carries a service type corresponding to the QoE measurement result.

Therefore, in this embodiment of this application, the upper layer of the access stratum of the terminal device sends, to the access stratum, the QoE measurement result and the indication information #1 corresponding to the QoE measurement result, so that the access stratum can determine, based on the indication information #1, to send the QoE measurement result to the MN or the SN of the terminal device, and thus the terminal device in an MR-DC architecture can send the QoE measurement result to a correct access network device.

Figure 9:
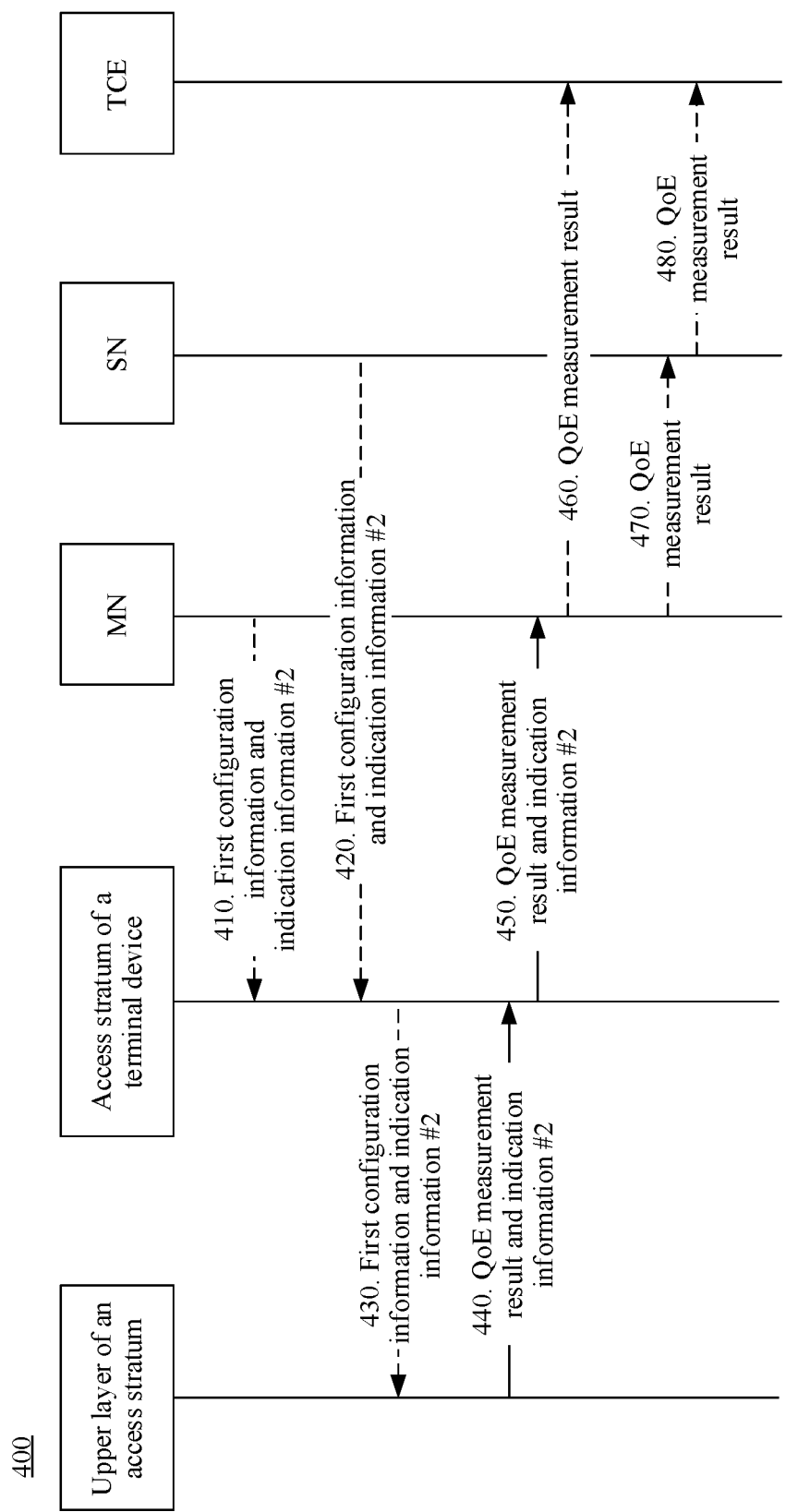
FIG. 9 is a schematic flowchart of another communication method according to an embodiment of this application.

FIG. 9 is a schematic flowchart of a communication method 400 according to an embodiment of this application. In the method 400, an access stratum of a terminal device receives a QoE measurement result and indication information #2 from an upper layer of the access stratum, and sends the QoE measurement result and the indication information #2 to a first access network device (for example, an MN) in a unified manner without a need of determining a specific access network device corresponding to the QoE measurement result, and then the MN sends the QoE measurement result to a network device (for example, an SN or a TCE) based on the indication information #2. As shown in FIG. 9, the method 400 includes steps 410 to 480.

It should be noted that, in the method 400, an example in which the access stratum of the terminal device is preconfigured to send the QoE measurement result and the indication information #2 to the MN is used for description. In another embodiment, the access stratum may be alternatively preconfigured to send the QoE measurement result and the indication information #2 to the SN. This is not limited in this embodiment of this application. The following provides descriptions mainly based on that the terminal device is preconfigured to send the QoE measurement result and the indication information #2 to the MN. When the terminal device is preconfigured to send the QoE measurement result and the indication information #2 to the SN, for specific implementation, refer to related descriptions of sending the QoE measurement result and the indication information #2 by the terminal device to the MN. Some simple adaptation may be needed, but also falls within the protection scope of this embodiment of this application.

It should be understood that the "preconfiguration" herein may include being indicated by signaling of an access network device or being predefined, for example, protocol-defined. Herein, the "predefinition" may be implemented in a manner in which corresponding code, a table, or other related indication information is prestored in a device (for example, including a terminal device and a network device). A specific implementation thereof is not limited in this application.

Optionally, 410. The MN sends first configuration information and the indication information #2 to the access stratum of the terminal device, where the first configuration information indicates the terminal device to perform application-layer QoE measurement. For example, the indication information #2 indicates that an access network device that sends the first configuration information is the MN of the terminal device.

It should be noted that, when receiving the QoE measurement result from the access stratum of the terminal device, the MN may learn, based on the indication information #2, whether the QoE measurement result is a QoE measurement result corresponding to application-layer measurement configuration information delivered by the corresponding MN or a QoE measurement result corresponding to application-layer measurement configuration information delivered by the corresponding SN.

Optionally, 420. The SN sends the first configuration information and the indication information #2 to the access stratum of the terminal device, where the first configuration information indicates the terminal device to perform the application-layer QoE measurement, and the indication information #2 indicates that an access network device that sends the first configuration information is the SN of the terminal device.

In the method 400, both step 410 and step 420 may be performed, or one of the two steps may be performed. In other words, either the MN or the SN herein may indicate the terminal device to perform the application-layer QoE measurement.

For example, the first configuration information may be the application-layer measurement configuration information in FIG. 6. This is not limited in this embodiment of this application. Specifically, for the first configuration information and the indication information #2, refer to descriptions in FIG. 3. Details are not described again.

430. The access stratum of the terminal device sends the first configuration information and the indication information #2 to the upper layer of the access stratum.

Optionally, the access stratum may send the first configuration information and the indication information #2 to the upper layer of the access stratum after receiving the first configuration information and the indication information #2 from the MN, or after receiving the first configuration information and the indication information #2 from the SN.

It should be noted that, that the access stratum of the terminal device sends the indication information #2 to the upper layer of the access stratum means that the access stratum may directly send the indication information #2 to the upper layer, and the access stratum does not need to learn of (or perceive, or know) content of the indication information #2. In other words, the access stratum does not need to determine, based on the indication information #2, that an access network device that sends the first configuration information is the MN.

That the access stratum of the terminal device sends the first configuration information to the upper layer of the access stratum may include that the access stratum directly sends the first configuration information to the upper layer, or may include that the access stratum obtains new configuration information based on the first configuration information and sends the configuration information to the upper layer. The new configuration information indicates to perform the application-layer QoE measurement.

440. The upper layer of the access stratum sends the QoE measurement result and the indication information #2 to the access stratum.

The upper layer of the access stratum of the terminal device may obtain the QoE measurement result. For example, the upper layer may receive the QoE measurement result from an application layer, or when the upper layer is the application layer, the upper layer may perform QoE measurement based on the first configuration information to obtain the QoE measurement result. Then, the upper layer may send the QoE measurement result and the indication information #2 to the access stratum.

For example, the upper layer may report the QoE measurement result and the indication information #2 according to a specific rule. In some implementations, the rule may be included in the first configuration information. This is not limited in this embodiment of this application. For example, the upper layer may periodically report the QoE measurement result based on a QoE reporting periodicity, or report the QoE measurement result only after a session ends. This is not limited in this embodiment of this application.

It should be noted that, the upper layer may directly send the indication information #2 to the access stratum, and does not need to learn of (or perceive, or know) content of the indication information #2. In other words, the upper layer does not need to determine, based on the indication information #2, that an access network device that sends the first configuration information is the MN.

450. The access stratum of the terminal device sends the QoE measurement result and the indication information #2 to the MN. Correspondingly, the MN receives the QoE measurement result and the indication information #2 from the terminal device.

Herein, after receiving the QoE measurement result and the indication information #2 from the upper layer of the access stratum, the access stratum of the terminal device sends the QoE measurement result and the indication information #2 to the MN in a unified manner without a need of determining a specific access network device corresponding to the QoE measurement result. That the access stratum of the terminal device sends the QoE measurement result and the indication information #2 to the MN may be protocol-defined, or the terminal device is preconfigured to send the QoE measurement result and the indication information #2 to the MN.

In some implementations, the access stratum may include the QoE measurement result and the indication information #2 in an RRC message, and send the RRC message to the MN. In this case, the QoE measurement result may be encapsulated in the RRC message in a form of a container. Alternatively, the indication information #2 may be encapsulated in the container, or the indication information #2 is included outside the container in the RRC message in a form other than the container. Details are not described.

In some optional implementations, the access network device may configure a dedicated signaling bearer (for example, an SRB 4) for the terminal device to transmit the QoE measurement result and the indication information #2. For example, a transmission priority of the SRB 4 is lower than a priority of another SRB.

It should be noted that an MN that sends the first configuration information and an MN that receives the QoE measurement result may not be a same access network device, or may be a same access network device. This is not limited in this embodiment of this application. For example, when the terminal device hands over a serving MN due to mobility of the terminal device, the two MNs are not a same MN. Optionally, when the two MNs are not a same MN, during handover, a source access network device sends the indication information #2 to a target access network device, so that the target access network device can learn, based on the indication information #2, that the source access network device configures the first configuration information. When receiving the QoE measurement result and the indication information #2 from the terminal device, the target access network device may send the QoE measurement result to the network device based on the indication information #2.

It should be further noted that, in this embodiment of this application, an access network device that receives the QoE measurement result is predefined, for example, may be protocol-defined, or it is preset that the terminal device is configured to send the QoE measurement result to the access network device. This is not limited in this embodiment of this application. In this way, in this embodiment of this application, an access network device that sends the first configuration information and an access network device that receives the QoE measurement result may be access network devices of a same type. For example, both are MNs or both are SNs. Alternatively, an access network device that sends the first configuration information and an access network device that receives the QoE measurement result may be access network devices of different types. For example, the MN delivers the first configuration information, and the SN receives the QoE measurement result; or the SN delivers the first configuration information, and the MN receives the QoE measurement result. This is not limited in this embodiment of this application.

In this embodiment of this application, after receiving the QoE measurement result and the indication information #2, the MN may send the QoE measurement result to the network device based on the indication information #2. For example, the network device may be a TCE corresponding to the MN, a TCE corresponding to the SN, an SN, or the like. This is not limited. With reference to steps 460 to 480, the following describes a specific implementation in which the MN sends the QoE measurement result to the network device.

460. The MN sends the QoE measurement result to a TCE.

In a possible case, an access network device that delivers the first configuration information and an access network device that receives the QoE measurement result correspond to a same type, in other words, are access network devices of a same type. For example, the method 400 includes step 410 but does not include step 420. To be specific, the MN sends the first configuration information and the indication information #2 to the access stratum of the terminal device. In this case, the MN may determine, based on the indication information #2 received from the terminal device, that the first configuration information is delivered by the MN, to be specific, the first configuration information corresponding to the QoE measurement result received from the terminal device is delivered by the MN. In this case, the MN sends the QoE measurement result to the TCE corresponding to the MN.

In an example, in this case, the indication information #2 may include a TCE ID corresponding to the MN. In this case, the MN may obtain a TCE IP corresponding to the TCE ID based on a mapping relationship between a TCE ID and a TCE IP address, and then send the QoE measurement result to a TCE corresponding to the TCE IP.

In another example, when the indication information #2 includes service type information, if the MN determines that the first configuration information of QoE measurement corresponding to a service type is configured by the MN for the terminal device, the MN may send the QoE measurement result to the TCE corresponding to the MN.

In another possible case, an access network device that delivers the first configuration information and an access network device that receives the QoE measurement result are access network devices of different types. For example, the method 400 includes step 420 but does not include step 410. To be specific, the SN sends the first configuration information and the indication information #2 to the access stratum of the terminal device. In this case, the MN may determine, based on the indication information #2, that the first configuration information is delivered by the SN, to be specific, the first configuration information corresponding to the QoE measurement result received from the terminal device is delivered by the SN. In this case, the MN sends the QoE measurement result to the TCE corresponding to the SN.

In an example, in this case, the indication information #2 may include a TCE ID corresponding to the SN. In this case, the MN may send, based on the mapping relationship between a TCE ID and a TCE IP address, the QoE measurement result to a TCE corresponding to the TCE IP.

In another example, when the indication information #2 includes service type information, if the MN determines that the first configuration information of QoE measurement corresponding to a service type is not configured by the MN for the terminal device, the MN may send the QoE measurement result to the TCE corresponding to the SN.

Optionally, before step 420, the SN may send, to the MN, a TCE ID that corresponds to the QoE measurement and that is configured by the SN and a TCE IP address corresponding to the TCE ID. Alternatively, the SN may send, to the MN, a TCE IP address that corresponds to the QoE measurement and that is configured by the SN. In this way, when the MN determines that the first configuration information is delivered by the SN, to be specific, the first configuration information corresponding to the QoE measurement result received from the terminal device is delivered by the SN, the MN may send, based on the TCE IP address that corresponds to the QoE measurement and that is configured by the SN, the QoE measurement result to the TCE corresponding to the SN.

In some implementations, a TCE ID that corresponds to the QoE measurement and that is delivered by the MN is the same as a TCE ID that corresponds to the QoE measurement and that is delivered by the SN. In this case, the indication information #2 may include a trace ID, and the MN may send the QoE measurement result together with the trace ID to a TCE corresponding to the TCE ID. In this way, when receiving the QoE measurement result and the trace ID, the TCE can determine, based on the trace ID, whether the QoE measurement result corresponds to the first configuration information configured by the MN or corresponds to the first configuration information configured by the SN. For example, when the trace ID is allocated by a CN, an OAM, or an EM to the MN for performing the QoE measurement, the QoE measurement result corresponds to the first configuration information configured by the MN; or when the trace ID is allocated by the CN, the OAM, or the EM to the SN for performing the QoE measurement, the QoE measurement result corresponds to the first configuration information configured by the SN.

470. The MN sends the QoE measurement result to the SN.

For example, an access network device that delivers the first configuration information and an access network device that receives the QoE measurement result are different, to be specific, are access network devices of different types. For example, the method 400 includes step 420 but does not include step 410. To be specific, the SN sends the first configuration information and the indication information #2 to the access stratum of the terminal device. In this case, the MN may determine, based on the indication information #2, that the first configuration information is delivered by the SN, to be specific, the first configuration information corresponding to the QoE measurement result received from the terminal device is delivered by the SN. In this case, the MN sends the QoE measurement result to the SN.

In a specific example, when the indication information #2 includes service type information, if the MN determines that the first configuration information of QoE measurement corresponding to a service type is not configured by the MN for the terminal device, the MN may send the QoE measurement result to the SN.

480. The SN sends the QoE measurement result to a TCE.

Specifically, after receiving the QoE measurement result from the MN, the SN sends the QoE measurement result to the TCE corresponding to the SN.

It should be noted that, when that the terminal device sends the QoE measurement result and the indication information #2 to the SN is protocol-predefined or the terminal device is preconfigured to send the QoE measurement result and the indication information #2 to the SN, for a specific implementation in which the SN sends the QoE measurement result to the network device, refer to related descriptions of sending the QoE measurement result and the indication information #2 by the terminal device to the MN. Some simple adaptation may be needed.

Therefore, in this embodiment of this application, the access stratum of the terminal device is preconfigured to send the QoE measurement result and the indication information #2 to the MN (or the SN) in a unified manner, and then the MN (or the SN) sends the QoE measurement result to the network device based on the indication information #2. In other words, the access stratum of the terminal device sends the measurement result to the MN (or the SN) without a need of determining whether the first configuration information corresponding to the QoE measurement result is delivered by the MN or the SN, to reduce processing complexity of the terminal device.

Figure 10:
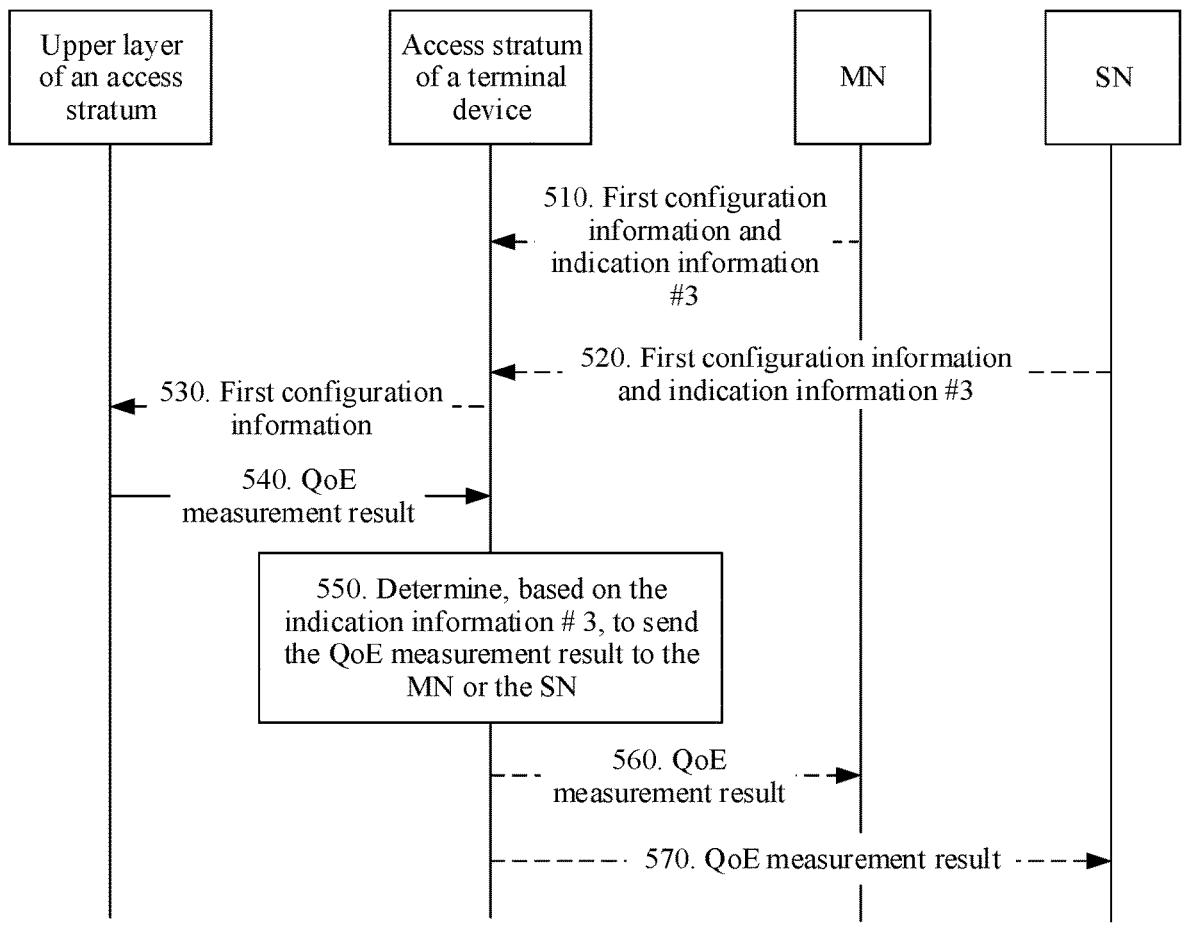
FIG. 10 is a schematic flowchart of another communication method according to an embodiment of this application.

FIG. 10 is a schematic flowchart of a communication method 500 according to an embodiment of this application. In the method 500, when sending application-layer measurement configuration information to a terminal device, an access network device (for example, an MN or an SN) may indicate, to an access stratum of the terminal device, a specific access network device, for example, the MN or the SN, to which a QoE measurement result obtained based on the application-layer measurement configuration information is to be reported. As shown in FIG. 10, the method 500 includes steps 510 to 570.

Optionally, 510. The MN sends first configuration information and indication information #3 to the access stratum of the terminal device, where the first configuration information indicates the terminal device to perform application-layer QoE measurement, the indication information #3 indicates the access stratum of the terminal device to send the QoE measurement result to a first access network device, and the first access network device is the MN or the SN.

The indication information #3 indicates a specific node to which the access stratum of the terminal device reports the QoE measurement result obtained based on the application-layer measurement configuration information (for example, application-layer measurement configuration information in a same message as the indication information #3) corresponding to the indication information #3. In other words, a specific node to which a QoE measurement result corresponding to each piece of application-layer measurement configuration information is to be reported needs to be indicated once. Alternatively, the indication information #3 may indicate a specific node to which the access stratum of the terminal device reports QoE measurement results obtained based on all application-layer measurement configuration information, or indicate a specific node to which the access stratum of the terminal device reports QoE measurement results obtained based on all application-layer measurement configuration information of a specific type. In this case, a specific node to which QoE measurement results corresponding to a plurality of pieces of application-layer measurement configuration information are to be reported may need to be indicated only once. Herein, the node is an access network device, for example, the MN or the SN.

For example, the first configuration information may be the application-layer measurement configuration information in FIG. 6. This is not limited in this embodiment of this application. For details, refer to the descriptions in FIG. 6. Details are not described again.

For example, the indication information #3 may include at least one of QoE service type information, node type information, and RAT type information.

For example, when the indication information #3 includes a service type corresponding to application-layer measurement configuration information delivered by the MN, node type information of the MN, and a RAT type corresponding to the MN, the indication information #3 may indicate the access stratum of the terminal device to send, to the MN, the QoE measurement result obtained based on the application-layer measurement configuration information.

For another example, when the indication information #3 includes a service type corresponding to application-layer measurement configuration information delivered by the SN, node type information of the SN, and a RAT type corresponding to the SN, the indication information #3 may indicate the access stratum of the terminal device to send, to the SN, the QoE measurement result obtained based on the application-layer measurement configuration information.

In an example, when the indication information #3 includes the service type information, the indication information #3 may further specifically indicate QoE measurement results/a QoE measurement result corresponding to specific service types/a service type to be reported to the MN, and/or QoE measurement results/a QoE measurement result corresponding to specific service types/a service type to be reported to the SN. For example, the indication information #3 may indicate the terminal device to report, to the MN, QoE measurement results corresponding to a service type 1 and a service type 2, and report, to the SN, a QoE measurement result corresponding to a service type 3.

In some optional implementations, before step 510, the MN and the SN may further negotiate a specific node through which the QoE measurement result is reported. For example, the MN may notify the SN to send, to the SN, the QoE measurement result corresponding to the first configuration information delivered by the MN, the MN may request the SN to send, to the MN, the QoE measurement result corresponding to the first configuration information delivered by the SN, the SN may request the MN to send, to the MN, the QoE measurement result corresponding to the first configuration information delivered by the SN, the MN may notify the SN to send the QoE measurement result of a service type to the SN, or the SN may request the MN to send the QoE measurement result of a service type to the MN.

Optionally, when performing negotiation, the MN and the SN may further exchange a TCE IP address corresponding to the first configuration information. For example, when the MN requests the SN to send, to the MN, the QoE measurement result corresponding to the first configuration information delivered by the SN, or the SN requests the MN to send, to the MN, the QoE measurement result corresponding to the first configuration information delivered by the SN, the SN may send, to the MN, the TCE IP address corresponding to the first configuration information. In this way, when receiving the QoE measurement result, the MN can send the QoE measurement result to a correct TCE based on the TCE IP address.

Optionally, the SN may further send a trace ID to the MN. The MN sends the trace ID and the QoE measurement result to the TCE. Alternatively, when a TCE IP address corresponding to the first configuration information delivered by the MN is the same as a TCE IP address corresponding to the first configuration information delivered by the SN, the SN may send the trace ID to the MN. In this way, the MN may send the trace ID together with the QoE measurement result to the TCE, so that the TCE can determine, based on the trace ID, whether the QoE measurement result corresponds to the first configuration information configured by the MN or corresponds to the first configuration information configured by the SN.

For example, when the MN notifies the SN to send, to the SN, the QoE measurement result corresponding to the first configuration information delivered by the MN, the MN may send, to the SN, a TCE IP address corresponding to the first configuration information. In this way, when receiving the QoE measurement result, the SN can send the QoE measurement result to a correct TCE based on the TCE IP address. Optionally, the MN may further send the trace ID to the SN. The SN sends the trace ID and the QoE measurement result to the TCE. Alternatively, when a TCE IP address corresponding to the first configuration information delivered by the MN is the same as a TCE IP address corresponding to the first configuration information delivered by the SN, the MN may send the trace ID to the SN. In this way, the SN may send the trace ID together with the QoE measurement result to the TCE, so that the TCE can determine, based on the trace ID, whether the QoE measurement result corresponds to the first configuration information configured by the MN or corresponds to the first configuration information configured by the SN.

In some implementations, the MN may include the first configuration information and the indication information #3 in an RRC message, and send the RRC message to the access stratum of the terminal device. In this case, the first configuration information may be encapsulated in the RRC message in a form of a container. Alternatively, the indication information #3 may be encapsulated in the container, or the indication information #3 is included outside the container in the RRC message in a form other than the container (for example, the indication information #3 is explicitly sent to the terminal device by using an information element (information element), and RRC layers of the access network device and the terminal device can know specific meanings of these information elements).

In some implementations, the indication information #3 may not be carried in the first configuration information. For example, the indication information #3 may be sent to the access stratum of the terminal device in an RRC message different from the first configuration information, or may be encapsulated in a same RRC message as the first configuration information and sent to the access stratum of the terminal device. This is not limited in this embodiment of this application.

Optionally, 520. The SN sends the first configuration information and the indication information #3 to the access stratum of the terminal device. Specifically, for the first configuration information and the indication information #3, refer to descriptions of step 510. Details are not described again.

In the method 500, both step 510 and step 520 may be performed, or one of the two steps may be performed. In other words, either the MN or the SN herein may indicate the terminal device to perform the application-layer QoE measurement, and indicate a specific node to which the access stratum of the terminal device reports the QoE measurement result.

530. The access stratum of the terminal device sends the first configuration information to an upper layer of the access stratum. Herein, the access stratum may send the first configuration information to the upper layer of the access stratum after receiving the first configuration information from the MN or after receiving the first configuration information from the SN.

It should be noted that, that the access stratum of the terminal device sends the first configuration information to the upper layer of the access stratum may include that the access stratum directly sends the first configuration information to the upper layer, or may include that the access stratum obtains new configuration information based on the first configuration information, and sends the configuration information to the upper layer. The new configuration information indicates the upper layer to perform the application-layer QoE measurement.

540. The upper layer of the access stratum sends the QoE measurement result to the access stratum.

The upper layer of the access stratum of the terminal device may obtain the QoE measurement result. For example, the upper layer may receive the QoE measurement result from an application layer, or when the upper layer is the application layer, the upper layer may perform QoE measurement based on the first configuration information to obtain the QoE measurement result. Then, the upper layer may send the QoE measurement result to the access stratum.

For example, the upper layer may report the QoE measurement result according to a specific rule. In some implementations, the rule may be included in the first configuration information. This is not limited in this embodiment of this application. For example, the upper layer may periodically report the QoE measurement result based on a QoE reporting periodicity, or report the QoE measurement result only after a session ends. This is not limited in this embodiment of this application.

550. The access stratum of the terminal device determines, based on the indication information #3, whether to send the QoE measurement result to the MN or the SN.

In an example, when the indication information #3 indicates to send all QoE measurement results to the MN, step 560 is performed, to be specific, the access stratum sends, to the MN, all QoE measurement results received from the upper layer. When the indication information #3 indicates to send all QoE measurement results to the SN, step 570 is performed, to be specific, the access stratum sends, to the SN, all QoE measurement results received from the upper layer.

In another example, when the indication information #3 indicates to report the QoE measurement results of the service type 1 and the service type 2 to the MN, and report the QoE measurement result of the service type 3 to the SN, when a service type corresponding to the QoE measurement result is the service type 1 or the service type 2, step 560 is performed, to be specific, the access stratum sends the QoE measurement result to the MN. When the service type corresponding to the QoE measurement result is the service type 3, step 570 is performed, to be specific, the access stratum sends the QoE measurement result to the SN.

Correspondingly, in step 560, the MN receives the QoE measurement result. In step 570, the SN receives the QoE measurement result. After receiving the QoE measurement result, the MN or the SN may directly send the QoE measurement result to the TCE, or send the QoE measurement result to another access network device.

For example, after receiving the QoE measurement result, the MN may directly send the QoE measurement result to the TCE, and the TCE determines whether the QoE measurement result corresponds to the first configuration information delivered by the MN or the first configuration information delivered by the SN. For another example, after the MN receives the QoE measurement result, when the MN determines that the QoE measurement result corresponds to the first configuration information delivered by the SN, for example, the MN may determine, based on a service type corresponding to the QoE measurement result, that QoE measurement of the service type is not configured by the MN for the terminal device, the MN may send the QoE measurement result to the SN, and then the SN sends the measurement result to the TCE. After the SN receives the QoE measurement result, a processing manner is similar to that of the MN. Details are not described again.

Therefore, in this embodiment of this application, a specific node to which the terminal device reports the QoE measurement result is indicated by using an access network device, so that the terminal device only needs to send the QoE measurement result to the specific node based on an indication of the access network device. This can help reduce processing complexity of the terminal device, and help a network side determine, based on load of a node, the specific node to which the QoE measurement result is sent, to reduce load of a node that receives the QoE measurement result.

In some implementations, the network side may change a bearer type of a service. For example, the access network device may switch a bearer type of a first service between an MCG bearer, an SCG bearer, and a split bearer, and/or switch the bearer type of the first service between an MN terminated bearer and an SN terminated bearer. In this case, the terminal device may report the QoE measurement result based on a method shown in FIG. 11.

Figure 11:
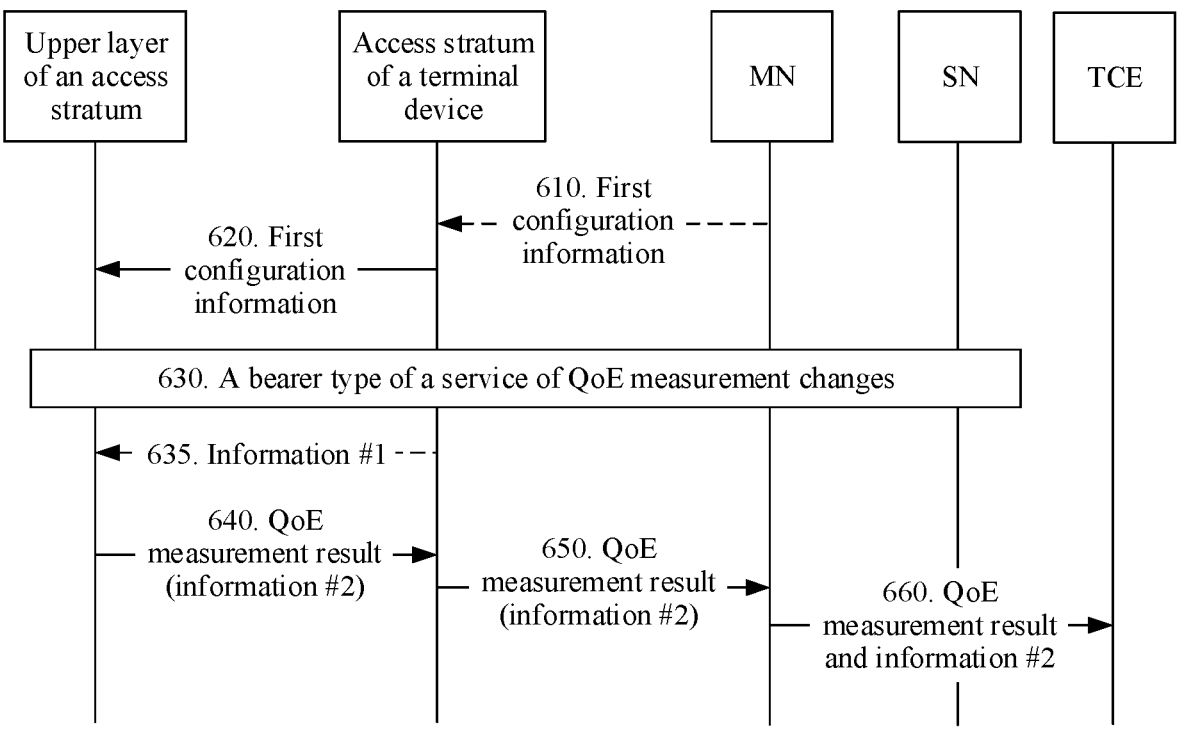
FIG. 11 is a schematic flowchart of another communication method according to an embodiment of this application.

FIG. 11 is a schematic flowchart of a communication method 600 according to an embodiment of this application. In the method 600, a network side changes a bearer type of a service. As shown in FIG. 11, the method 600 includes steps 610 to 660.

610. An MN sends first configuration information to an access stratum of a terminal device, where the first configuration information indicates the terminal device to perform application-layer QoE measurement.

For example, the first configuration information may be the application-layer measurement configuration information in FIG. 10. This is not limited in this embodiment of this application. For details, refer to the descriptions in FIG. 6. Details are not described again.

It should be noted that an example in which the first configuration information is sent by the MN to the access stratum of the terminal device is used herein for description. In another possible implementation, the first configuration information may alternatively be sent by an SN to the access stratum of the terminal device. This is not limited in this embodiment of this application.

620. The access stratum of the terminal device sends the first configuration information to an upper layer of the access stratum.

Specifically, for step 620, refer to the descriptions of step 530 in FIG. 5. Details are not described again.

630. A bearer type of a service of QoE measurement changes.

For example, a bearer type of a first service of the QoE measurement is switched between an MCG bearer, an SCG bearer, and a split bearer, and/or the bearer type of the first service is switched between an MN terminated bearer and an SN terminated bearer.

In some optional implementations, when the access stratum of the terminal device learns that the bearer type corresponding to the service type of the QoE measurement changes, for example, when the access stratum learns that the bearer type of the first service of the QoE measurement changes from the MCG bearer to the SCG bearer, the access stratum may further perform step 635, to be specific, send information #1 to the upper layer to trigger reporting of a QoE measurement result, or notify a bearer type corresponding to the service type of the QoE measurement before the change, and a bearer type corresponding to the service type of the QoE measurement after the change.

Herein, triggering reporting of the QoE measurement result is triggering the upper layer to report the QoE measurement result. For example, reporting the QoE measurement result may include: The upper layer sends the QoE measurement result to the access stratum, and the access stratum sends the measurement result to an access network device. This is not limited in this application.

640. The upper layer of the access stratum sends the QoE measurement result to the access stratum.

The upper layer of the access stratum of the terminal device may obtain the QoE measurement result. For details, refer to the descriptions of step 540 in FIG. 10. Details are not described again.

In some optional implementations, the upper layer of the access stratum may report the QoE measurement result in a QoE measurement result reporting manner indicated in the first configuration information.

In some optional implementations, when the information #1 is used to trigger reporting of the QoE measurement result, the upper layer of the access stratum may report the QoE measurement result based on the information #1 in step 630. For example, after receiving the information #1, the upper layer of the access stratum may report the QoE measurement result, to be specific, send the QoE measurement result to the access stratum.

In some optional implementations, when the information #1 is used to notify the bearer types corresponding to the service type of the QoE measurement before and after the change, the upper layer may send the QoE measurement result to the access stratum based on an indication in the first configuration information. In addition to sending the QoE measurement result to the access stratum, the upper layer may send information #2 to the access stratum, to indicate bearer types of the service type corresponding to the QoE measurement result in different time periods. In other words, the upper layer may indicate, to the access stratum, a bearer type change of the terminal device that has occurred. For example, the information #2 may include an MCG bearer, an SCG bearer, and a split bearer, indicating that a bearer type of the terminal device is changed from the MCG bearer to the SCG bearer, and then from the SCG bearer to the split bearer.

Optionally, when sending the QoE measurement result to the access stratum, the upper layer may further send, to the access stratum, time information corresponding to the bearer types in the different time periods, for example, a specific bearer type corresponding to the first service before or after a time point or between two time points.

In some possible implementations, the QoE measurement result may include the foregoing information #2, or the time information of the bearer types in the different time periods.

This is not limited in this embodiment of this application.

650. The access stratum of the terminal device sends the QoE measurement result to the MN.

It should be noted that, in FIG. 11, an example in which the access stratum of the terminal device sends the QoE measurement result to the MN is used for description. In another implementation, the access stratum of the terminal device may alternatively send the QoE measurement result to the SN. This is not limited in this application.

For example, the access stratum of the terminal device may send the QoE measurement result to the MN or the SN by using any possible method provided in FIG. 8, FIG. 9, FIG. 10, a combination thereof, or in another manner. This is not limited in this application.

In some optional implementations, when the upper layer of the access stratum sends the information #2 or the time information of the bearer types in the different time periods to the access stratum, the access stratum may send the QoE measurement result, and the information #2 or the time information of the bearer types in the different time periods to the MN. This is not limited in this application. The access stratum may encapsulate the QoE measurement result, and the information #2 or the time information of the bearer types in the different time periods into a same RRC message and send the RRC message to the MN, or send the QoE measurement result, and the information #2 or the time information of the bearer types in the different time periods to the MN by using different RRC messages. This is not limited in this embodiment of this application.

In some possible implementations, the QoE measurement result may include the foregoing information #2, or the time information of the bearer types in the different time periods.

660. The MN sends the QoE measurement result and the information #2 to a TCE.

In a possible case, when the MN receives the QoE measurement result and the information #2 from the access stratum of the terminal device, the MN may send the QoE measurement result and the information #2 to the TCE. Optionally, when the MN further receives the time information of the bearer types in the different time periods, the MN may send the time information of the bearer types in the different time periods to the TCE.

In another possible case, in steps 630 to 650, the access stratum of the terminal device does not need to send the information #1 to the upper layer of the access stratum, and the upper layer of the access stratum does not need to send the information #2 to the access stratum either. The MN may record a bearer type change that occurs during the QoE measurement, to be specific, record bearer types corresponding to the service type corresponding to the QoE measurement result obtained through the QoE measurement in different time periods. In other words, the MN itself determines the foregoing information #2. When handover between MNs occurs, to be specific, UE is handed over from a source MN to a target MN, the source MN sends the recorded information #2 to the target MN, and the MN continues to record the bearer type change that occurs during the QoE measurement. When receiving the QoE measurement result from the access stratum of the terminal device, the MN may send the QoE measurement result together with the information #2 to the TCE. Optionally, the MN may further record the time information of the bearer types in the different time periods. In this way, when sending the QoE measurement result to the TCE, the MN may further send the time information of the bearer types in the different time periods to the TCE.

Optionally, the MN may further indicate a network architecture to the TCE, for example, whether an integrated access and backhaul (integrated access and backhaul, IAB) network architecture is used, or whether a CU/DU network architecture is used.

It should be noted that, during the QoE measurement, in a protocol, changes of only several bearer types in the foregoing bearer types may be considered, for example, only conversion between the MN terminated MCG bearer and the SN terminated SCG bearer is considered. Alternatively, in the protocol, only a change of a bearer type in MR-DC in which an MCG and an SCG belong to different RATs may be considered. This is not limited in this embodiment of this application.

Correspondingly, after the TCE receives the QoE measurement result and the information #2 (or further receives information such as the time information corresponding to the different bearer types or a network structure), the TCE may associate the QoE measurement result with the bearer type of the service type of the QoE measurement, for example, learn whether a service corresponding to the service type of the QoE measurement is carried in MCG for transmission or carried in SCG for transmission, to subsequently optimize a network based on the QoE measurement result and the associated bearer type of the service type.

Therefore, in this embodiment of this application, when the network side changes a bearer type of a service, the terminal device may send, to an access network device, the bearer type of the service type corresponding to the QoE measurement result, or the access network device records the bearer type of the service type corresponding to the QoE measurement, so that the QoE measurement result can be associated with the bearer type of the service type of the QoE measurement, to help optimize a network based on the QoE measurement result and the associated bearer type of the service type.

In some optional embodiments, in an MR-DC scenario, if a configuration of an area scope corresponding to QoE measurement in a non-MR-DC scenario is still used, a change of a bearer type of a service may not be capable of being performed, or the network side needs to stop or cancel, when the bearer type of the service is changed, QoE measurement corresponding to a previously-configured QoE measurement configuration. Based on this, an embodiment of this application provides a QoE measurement method for an MR-DC scenario.

Figure 12:
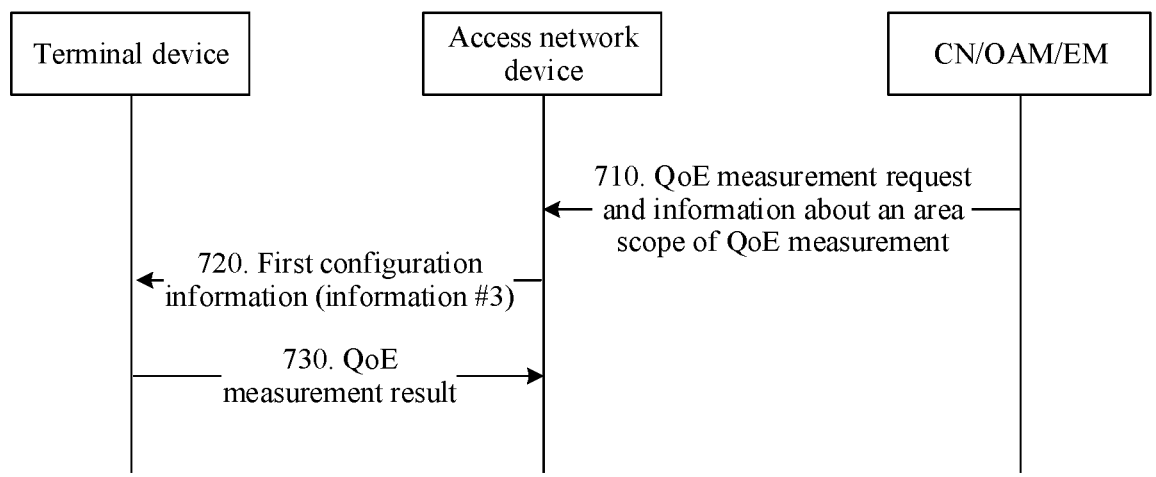
FIG. 12 is a schematic flowchart of another communication method according to an embodiment of this application.

FIG. 12 is a schematic flowchart of a communication method 700 according to an embodiment of this application. As shown in FIG. 12, the method 700 includes step 710 to step 730.

710. An access network device receives a QoE measurement request and information about an area scope of QoE measurement from a CN/an OAM/an EM. For the QoE measurement request, refer to the descriptions of step 101 in FIG. 6. Details are not described again.

For example, the information about the area scope of the QoE measurement includes related information of a plurality of RATs, for example, information about an area scope of a RAT 1 and information about an area scope of a RAT 2. Specifically, the information about the area scope may be one or more of the area scopes of QMC in Table 1.

Herein, the access network device may be an MN or an SN. This is not limited in this embodiment of this application.

720. The access network device sends first configuration information to a terminal device. For example, the first configuration information may be the application-layer measurement configuration information in FIG. 6. This is not limited in this embodiment of this application. For details, refer to the descriptions in FIG. 6. Details are not described again.

After receiving the information about the area scope of the QoE measurement from the CN/OAM/EM, the access network device may send the first configuration information to the terminal device based on the information about the area scope. For example, when the access network device determines that the terminal device is currently located in the area scope of the RAT 1 in the area scope of the QoE measurement, or located in the area scope of the RAT 2 in the area scope of the QoE measurement, the access network device may send the first configuration information to the terminal device. When the access network device determines that the terminal device is currently not located in the area scope of the RAT 1 in the area scope of the QoE measurement, and not located in the area scope of the RAT 2 in the area scope of the QoE measurement, the access network device may not send the first configuration information to the terminal device.

In some optional implementations, when a network side needs to change a bearer type of a service of the QoE measurement, if an area scope (for example, an area scope of a base station corresponding to the bearer type corresponding to the service type of the QoE measurement at an RLC/a MAC layer corresponding to the network side) corresponding to a target bearer type that needs to be changed is not within the area scope of the QoE measurement (for example, not in the area scope of the RAT 1 in the area scope of the QoE measurement, and not in the area scope of the RAT 2 in the area scope of the QoE measurement), the access network device may determine not to change the bearer type of the service. Alternatively, the access network device may notify the terminal device to stop current QoE measurement (in other words, stop all QoE measurement of the service type corresponding to the QoE measurement), stop reporting of a QoE measurement result, or continue QoE measurement corresponding to an already-started session in a service type corresponding to the current QoE measurement, but no longer perform QoE measurement for a subsequent new session.

Optionally, the access network device may send the information (for example, may be referred to as information #3) about the area scope of the QoE measurement to the terminal device. For example, the information about the area scope and the first configuration information may be encapsulated in a same RRC message or different RRC messages, or the information about the area scope may be carried in the first configuration information. This is not limited in this embodiment of this application.

In some optional implementations, when the access network device sends the information about the area scope of the QoE measurement to the terminal device, if the terminal device determines that an area scope (for example, an area scope of a base station corresponding to the bearer type corresponding to the service type of the QoE measurement at an RLC/a MAC layer corresponding to the network side) corresponding to the bearer type of the service of the QoE measurement is not within the area scope of the QoE measurement (for example, not in the area scope of the RAT 1 in the area scope of the QoE measurement, and not in the area scope of the RAT 2 in the area scope of the QoE measurement), the terminal device stops current QoE measurement (in other words, stops all QoE measurement of the service type corresponding to the QoE measurement), stops reporting of the QoE measurement result, or continue QoE measurement corresponding to an already-started session of the current QoE measurement, but no longer perform QoE measurement for a subsequent new session.

730. The terminal device sends the QoE measurement result to the access network device. Specifically, the terminal device may perform the QoE measurement based on the first configuration information to obtain the QoE measurement result.

For example, an access stratum of the terminal device may send the QoE measurement result to the MN or the SN by using any possible method provided in FIG. 8, FIG. 9, FIG. 10, a combination thereof, or in another manner. This is not limited in this application.

Therefore, in this embodiment of this application, in an MR-DC scenario, the network side device may still configure information about area scopes of a plurality of RATs for the QoE measurement, so that the terminal device in the MR-DC scenario can also perform the QoE measurement in areas of the plurality of RATs, and can still perform the QoE measurement when the access network device changes the bearer type corresponding to the service of the QoE measurement.

It should be noted that embodiments of this application may be used independently, or may be used jointly. This is not limited herein. For example, when a QoE measurement result is reported based on the method shown in FIG. 8, FIG. 9, or FIG. 10, a change of a bearer type of a service of QoE measurement may be reported to a TCE based on the method shown in FIG. 11, or corresponding information about an area scope may be configured for the QoE measurement based on the method shown in FIG. 12.

It may be understood that, in the foregoing embodiments of this application, the method implemented by the access network device may alternatively be implemented by a component (for example, a chip or a circuit) that can be used in the access network device, and the method implemented by the terminal device may alternatively be implemented by a component (for example, a chip or a circuit) that can be used in the terminal device.

Figure 13:
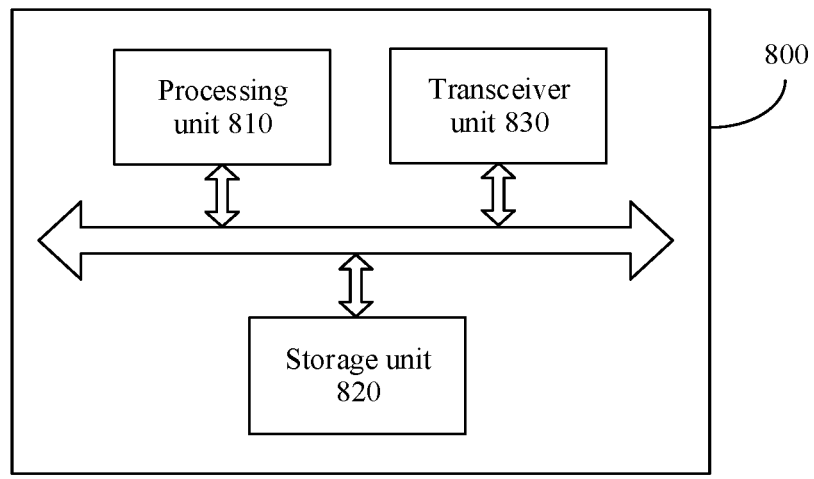
FIG. 13 is a schematic diagram of a wireless communication apparatus according to an embodiment of this application.

According to the foregoing methods, FIG. 13 is a schematic diagram of a wireless communication apparatus 800 according to an embodiment of this application.

In some embodiments, the apparatus 800 may be an access network device, or may be a chip or a circuit, for example, a chip or a circuit that can be disposed in an access network. In some embodiments, the apparatus 800 may be a terminal device, or may be a chip or a circuit, for example, a chip or a circuit that can be disposed in the terminal device.

The apparatus 800 may include a processing unit 810 (an example of a processor) and a transceiver unit 830.

Optionally, the transceiver unit 830 may be implemented using a transceiver, a transceiver-related circuit, or an interface circuit.

Optionally, the apparatus may further include a storage unit 820. In a possible manner, the storage unit 820 is configured to store instructions. Optionally, the storage unit may alternatively be configured to store data or information. The storage unit 820 may be implemented using a memory.

In a possible design, the processing unit 810 may be configured to execute the instructions stored in the storage unit 820, to enable the apparatus 800 to implement the steps performed by the access network device in the foregoing methods.

Further, the processing unit 810, the storage unit 820, and the transceiver unit 830 may communicate with each other through an internal connection path for transmission of control signals and/or data signals. For example, the storage unit 820 is configured to store a computer program. The processing unit 810 may be configured to invoke the computer program from the storage unit 820 and run the computer program, to control the transceiver unit 830 to receive a signal and/or send a signal, to complete the steps of the access network device in the foregoing methods.

In a possible design, the processing unit 810 may be configured to execute the instructions stored in the storage unit 820, to enable the apparatus 800 to implement the steps performed by the terminal device in the foregoing methods.

Further, the processing unit 810, the storage unit 820, and the transceiver unit 830 may communicate with each other through an internal connection path for transmission of control signals and/or data signals. For example, the storage unit 820 is configured to store a computer program. The processing unit 810 may be configured to invoke the computer program from the storage unit 820 and run the computer program, to control the transceiver unit 830 to receive a signal and/or send a signal, to complete the steps of the terminal device in the foregoing methods.

The storage unit 820 may be integrated into the processing unit 810, or may be disposed separately from the processing unit 810.

Optionally, if the apparatus 800 is a communication device, the transceiver unit 830 may include a receiver and a transmitter. The receiver and the transmitter may be a same physical entity or different physical entities. When the receiver and the transmitter are a same physical entity, the receiver and the transmitter may be collectively referred to as a transceiver.

Optionally, if the apparatus 800 is a chip or a circuit, the transceiver unit 830 may include an input interface and an output interface.

In an implementation, a function of the transceiver unit 830 may be considered to be implemented using a transceiver circuit or a transceiver-dedicated chip. The processing unit 810 may be considered to be implemented using a dedicated processing chip, a processing circuit, a processing unit, or a general-purpose chip.

In another implementation, a communication device (for example, the access network device or the terminal device) provided in this embodiment of this application may be considered to be implemented using a general-purpose computer. In other words, program code for implementing functions of the processing unit 810 and the transceiver unit 830 is stored in the storage unit 820, and the general-purpose processing unit implements the functions of the processing unit 810 and the transceiver unit 830 by executing the code in the storage unit 820.

In some implementations, when the apparatus 800 is the terminal device or the chip or the circuit disposed in the terminal device, the processing unit 810 is configured to be used by an access stratum of the terminal device to receive a quality of experience QoE measurement result and first indication information from an upper layer of the access stratum.

The processing unit 810 is further configured to be used by the access stratum to determine, based on the first indication information, to send the QoE measurement result to a master node or a secondary node of the terminal device.

Optionally, the apparatus 800 further includes the transceiver unit 830, configured to receive first configuration information from a first access network device, where the first configuration information indicates the terminal device to perform application-layer QoE measurement, and the first access network device is the master node or the secondary node of the terminal device.

The processing unit 810 is further configured to be used by the access stratum to send the first configuration information and the first indication information to the upper layer of the access stratum of the terminal device.

Optionally, the transceiver unit 830 is further configured to receive second indication information from the first access network device, where the second indication information indicates that the first access network device is the master node or the secondary node.

The processing unit 810 is further configured to be used by the access stratum to determine the first indication information based on the second indication information.

Optionally, the first indication information and the second indication information are a same piece of information.

Optionally, the transceiver unit 830 is further configured to receive third indication information from a second access network device, where the third indication information indicates the access stratum of the terminal device to send the QoE measurement result to a first access network device.

The first access network device is the master node and the second access network device is the secondary node, or the first access network device is the secondary node and the second access network device is the master node.

Optionally, the first indication information includes at least one of a trace identifier ID, a trace collection entity identifier TCE ID, QoE service type information, node type information, radio access technology RAT type information, a PDU session identifier, a 5G quality of service identifier 5QI, a quality of service flow identifier QFI, and a first identifier, where the first identifier is allocated by an operation, administration and maintenance OAM or an access network device.

Optionally, the processing unit 810 is further configured to:

be used by the access stratum to determine that a bearer type corresponding to a service type of the QoE measurement changes; and be used by the access stratum to send first information to the upper layer of the access stratum when the bearer type changes, where the first information is used to trigger reporting of the QoE measurement result, or the first information is used to notify bearer types corresponding to the service type of the QoE measurement before and after the change.

Optionally, when the first information is used to notify the bearer types corresponding to the service type of the QoE measurement before and after the change, the processing unit 810 is further configured to be used by the access stratum to receive second information from the upper layer of the access stratum, where the second information indicates bearer types of the service type corresponding to the QoE measurement result in different time periods.

Optionally, the processing unit 810 is further configured to be used by the access stratum to receive, from the upper layer of the access stratum, time information corresponding to the bearer types in the different time periods.

Optionally, the transceiver unit 830 is further configured to receive third information from a third access network device, where the third information indicates an area scope of the QoE measurement, the area scope includes area scopes of at least two RATs, and the third access network device is the master node or the secondary node of the terminal device.

In some implementations, when the apparatus 800 is the terminal device or the chip or the circuit disposed in the terminal device, the transceiver unit 830 is configured to receive first configuration information from a first access network device, where the first configuration information indicates the terminal device to perform application-layer quality of experience QoE measurement.

The transceiver unit 830 is further configured to receive second indication information from the first access network device, where the second indication information indicates that the first access network device is a master node or a secondary node of the terminal device.

The processing unit 810 is configured to be used by the access stratum of the terminal device to send the first configuration information and the second indication information to an upper layer of the access stratum.

The processing unit 810 is configured to be used by the access stratum to receive a QoE measurement result and the second indication information from the upper layer of the access stratum, where the QoE measurement result is obtained by performing the QoE measurement by the upper layer based on the first configuration information.

The transceiver unit 830 is further configured to send the second indication information and the QoE measurement result to a second access network device, where the first access network device is the same as the second access network device, the first access network device is the master node and the second access network device is the secondary node, or the first access network device is the secondary node and the second access network device is the master node.

Optionally, the second indication information includes at least one of a trace ID, a trace collection entity identifier TCE ID, a QoE service type, a node type, a radio access technology RAT type, a PDU session identifier, a 5G quality of service identifier 5QI, a quality of service flow identifier QFI, and a first identifier, where the first identifier is allocated by an operation, administration and maintenance OAM or an access network device.

In some implementations, when the apparatus 800 is the first access network device or the chip or the circuit disposed in the first access network device, the transceiver unit 830 is configured to receive a quality of experience QoE measurement result and second indication information from a terminal device, where the QoE measurement result is obtained by performing QoE measurement by the terminal device based on first configuration information, the second indication information indicates that a second access network device that sends the first configuration information to the terminal device is a master node or a secondary node of the terminal device, and the first configuration information indicates the terminal device to perform the application-layer QoE measurement.

The transceiver unit 830 is further configured to send the QoE measurement result to a network device based on the second indication information, where the first access network device is the same as the second access network device, the first access network device is the master node and the second access network device is the secondary node, or the first access network device is the secondary node and the second access network device is the master node.

Optionally, the first access network device is the same as the second access network device, and the transceiver unit 830 is specifically configured to send the QoE measurement result to a trace collection entity TCE corresponding to the first access network device.

Optionally, the first access network device is the master node and the second access network device is the secondary node, or the first access network device is the secondary node and the second access network device is the master node.

The transceiver unit 830 is specifically configured to send the QoE measurement result to a TCE corresponding to the second access network device, or send the QoE measurement result to the second access network device.

Optionally, the second indication information includes at least one of a trace ID, a trace collection entity identifier TCE ID, a QoE service type, a node type, a radio access technology RAT type, a PDU session identifier, a 5G quality of service identifier 5QI, a quality of service flow identifier QFI, and a first identifier, where the first identifier is allocated by an operation, administration and maintenance OAM or an access network device.

Optionally, the second indication information includes the trace collection entity TCE identifier ID, and the transceiver unit 830 is specifically configured to:

obtain, based on a relationship between a TCE ID and a TCE IP, a TCE IP corresponding to the TCE ID; and send the QoE measurement result to a TCE corresponding to the TCE IP.

Optionally, the second indication information includes the trace ID, and the transceiver unit 830 is specifically configured to send the QoE measurement result and the trace ID to the TCE.

Optionally, before the transceiver unit 830 receives the QoE measurement result and the second indication information from the terminal device, the transceiver unit is further configured to send the first configuration information and the second indication information to the terminal device.

In some implementations, when the apparatus 800 is an access network device or a chip or a circuit disposed in the access network device, the transceiver unit 830 is configured to receive a QoE measurement result from a terminal device.

The transceiver unit 830 is further configured to send the QoE measurement result and second information to a TCE, where the second information indicates bearer types corresponding to a service type corresponding to the QoE measurement result in different time periods.

Optionally, the apparatus further includes the processing unit 810, configured to determine the bearer types of the service type corresponding to the QoE measurement result in the different time periods.

Optionally, the processing unit 810 is further configured to determine time information corresponding to the bearer types in the different time periods, and the transceiver unit 830 is further configured to send the time information to the TCE.

Optionally, the transceiver unit 830 is further configured to receive, from the terminal device, the bearer types of the service type corresponding to the QoE measurement result in the different time periods.

Optionally, the transceiver unit 830 may further receive, from the terminal device, the time information corresponding to the bearer types in the different time periods, and send, to the TCE, the time information corresponding to the bearer types in the different time periods.

Optionally, the transceiver unit 830 is further configured to indicate a network architecture to the TCE, for example, whether an integrated access and backhaul (integrated access and backhaul, IAB) network architecture is used, or whether a CU/DU network architecture is used.

In some implementations, when the apparatus 800 is an access network device or a chip or a circuit disposed in the access network device, The transceiver unit 830 is configured to receive third information from a CN/an OAM/an EM, where the third information indicates an area scope of QoE measurement.

The transceiver unit 830 is further configured to send first configuration information to a terminal device based on information about the area scope, where the first configuration information indicates the terminal device to perform the application-layer quality of experience QoE measurement.

Optionally, the apparatus further includes the processing unit 810, configured to: when a network side needs to change a bearer type of a service of the QoE measurement, determine that an area scope corresponding to a target bearer type that needs to be changed is not within the area scope of the QoE measurement. The transceiver unit 830 is further configured to notify the terminal device to stop current QoE measurement, stop reporting of a QoE measurement result, or continue QoE measurement corresponding to an already-started session in a service type corresponding to the current QoE measurement, but no longer perform QoE measurement for a subsequent new session.

Optionally, the transceiver unit 830 is further configured to send third information to the terminal device.

In some implementations, when the apparatus 800 is the terminal device or the chip or the circuit disposed in the terminal device, the processing unit 810 is configured to determine that a bearer type corresponding to a service type of QoE measurement changes.

The processing unit 810 is further configured to be used by an access stratum of the terminal device to send first information to an upper layer of the access stratum when the bearer type changes, where the first information is used to trigger reporting of the QoE measurement result, or the first information is used to notify bearer types corresponding to the service type of the QoE measurement before and after the change.

Optionally, when the first information is used to notify the bearer types corresponding to the service type of the QoE measurement before and after the change, the processing unit 810 is further configured to be used by the access stratum to receive second information from the upper layer of the access stratum, where the second information indicates bearer types of the service type corresponding to the QoE measurement result in different time periods.

Optionally, the processing unit 810 is further configured to be used by the access stratum to receive, from the upper layer of the access stratum, time information corresponding to the bearer types in the different time periods.

The units in the foregoing embodiment may also be referred to as modules, circuits, or components.

Functions and actions of the modules or the units in the apparatus 800 listed above are merely examples for description. When the apparatus 800 is configured in or is the access network device, the modules or the units in the apparatus 800 may be configured to perform the actions or processing processes performed by the access network device in the foregoing methods. When the apparatus 800 is configured in or is the terminal device, the modules or the units in the apparatus 800 may be configured to perform the actions or processing processes performed by the terminal device in the foregoing methods.

For concepts, explanations, detailed descriptions, and other steps of the apparatus 800 that are related to the technical solutions provided in embodiments of this application, refer to the descriptions of the content in the foregoing methods or other embodiments. Details are not described herein again.

Figure 14:
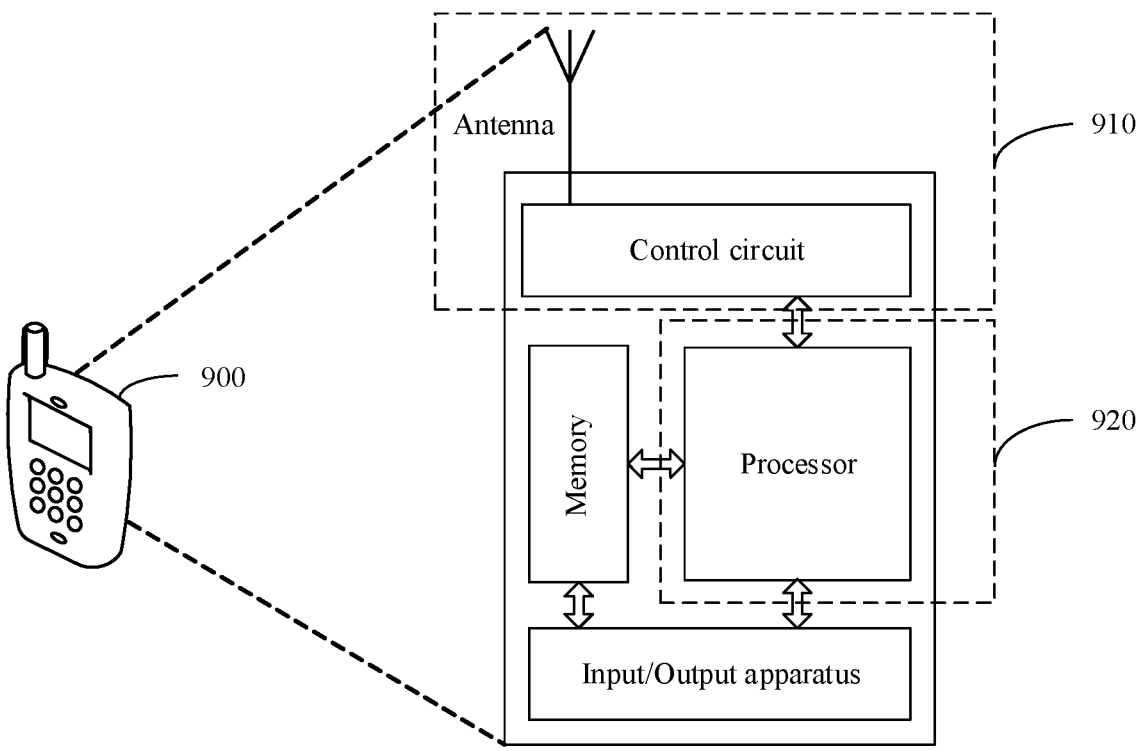
FIG. 14 is a schematic diagram of a structure of a terminal device according to this application.

FIG. 14 is a schematic diagram of a structure of a terminal device 900 according to this application. The terminal device 900 may perform the actions performed by the terminal device in the foregoing method embodiments.

For ease of description, FIG. 14 shows only main components of the terminal device. As shown in FIG. 14, the terminal device 900 includes a processor, a memory, a control circuit, an antenna, and an input/output apparatus.

The processor is mainly configured to process a communication protocol and communication data, control the entire terminal device, execute a software program, and process data of the software program, for example, is configured to support the terminal device in performing the actions described in the foregoing embodiments of the method. The memory is mainly configured to store the software program and the data, for example, store a codebook described in the foregoing embodiments. The control circuit is mainly configured to convert a baseband signal and a radio frequency signal and process the radio frequency signal. The control circuit and the antenna together may also be referred to as a transceiver, and are mainly configured to receive and send a radio frequency signal in a form of an electromagnetic wave. The input/output apparatus, such as a touchscreen, a display, or a keyboard, is mainly configured to: receive data input by a user and output data to the user.

After the terminal device is powered on, the processor may read the software program in the storage unit, interpret and execute instructions of the software program, and process data of the software program. When data needs to be sent wirelessly, the processor performs baseband processing on the to-be-sent data, and then outputs a baseband signal to a radio frequency circuit. The radio frequency circuit performs radio frequency processing on the baseband signal, and then sends, through the antenna, a radio frequency signal in an electromagnetic wave form. When data is sent to the terminal device, the radio frequency circuit receives the radio frequency signal through the antenna, converts the radio frequency signal into a baseband signal, and outputs the baseband signal to the processor. The processor converts the baseband signal into data, and processes the data.

A person skilled in the art may understand that, for ease of description, FIG. 14 shows only one memory and only one processor. In an actual terminal device, there may be a plurality of processors and memories. The memory may also be referred to as a storage medium, a storage device, or the like. This is not limited in this embodiment of this application.

For example, the processor may include a baseband processor and a central processing unit. The baseband processor is mainly configured to process the communication protocol and the communication data. The central processing unit is mainly configured to control the entire terminal device, execute the software program, and process the data of the software program. The processor in FIG. 14 integrates functions of the baseband processor and the central processing unit. A person skilled in the art may understand that the baseband processor and the central processing unit may alternatively be separate processors, and are interconnected by using a technology such as a bus. A person skilled in the art may understand that the terminal device may include a plurality of baseband processors to adapt to different network standards, and the terminal device may include a plurality of central processing units to enhance processing capabilities of the terminal device, and components of the terminal device may be connected through various buses. The baseband processor may also be expressed as a baseband processing circuit or a baseband processing chip. The central processing unit may also be expressed as a central processing circuit or a central processing chip. A function of processing the communication protocol and the communication data may be built in the processor, or may be stored in the storage unit in a form of a software program, and the processor executes the software program to implement a baseband processing function.

For example, in this embodiment of this application, the antenna and the control circuit that have sending and receiving functions may be considered as a transceiver unit 910 of the terminal device 900, and the processor having a processing function may be considered as a processing unit 920 of the terminal device 900. As shown in FIG. 14, the terminal device 900 includes the transceiver unit 910 and the processing unit 920. The transceiver unit 910 may also be referred to as a transceiver, a transceiver apparatus, or the like. Optionally, a component that is in the transceiver unit 910 and that is configured to implement a receiving function may be considered as a receiving unit, and a component that is in the transceiver unit 910 and that is configured to implement a sending function may be considered as a sending unit. In other words, the transceiver unit includes the receiving unit and the sending unit. For example, the receiving unit may also be referred to as a receiver, a receiving circuit, or the like, and the sending unit may also be referred to as a transmitter, a transmitting circuit, or the like.

Figure 15:
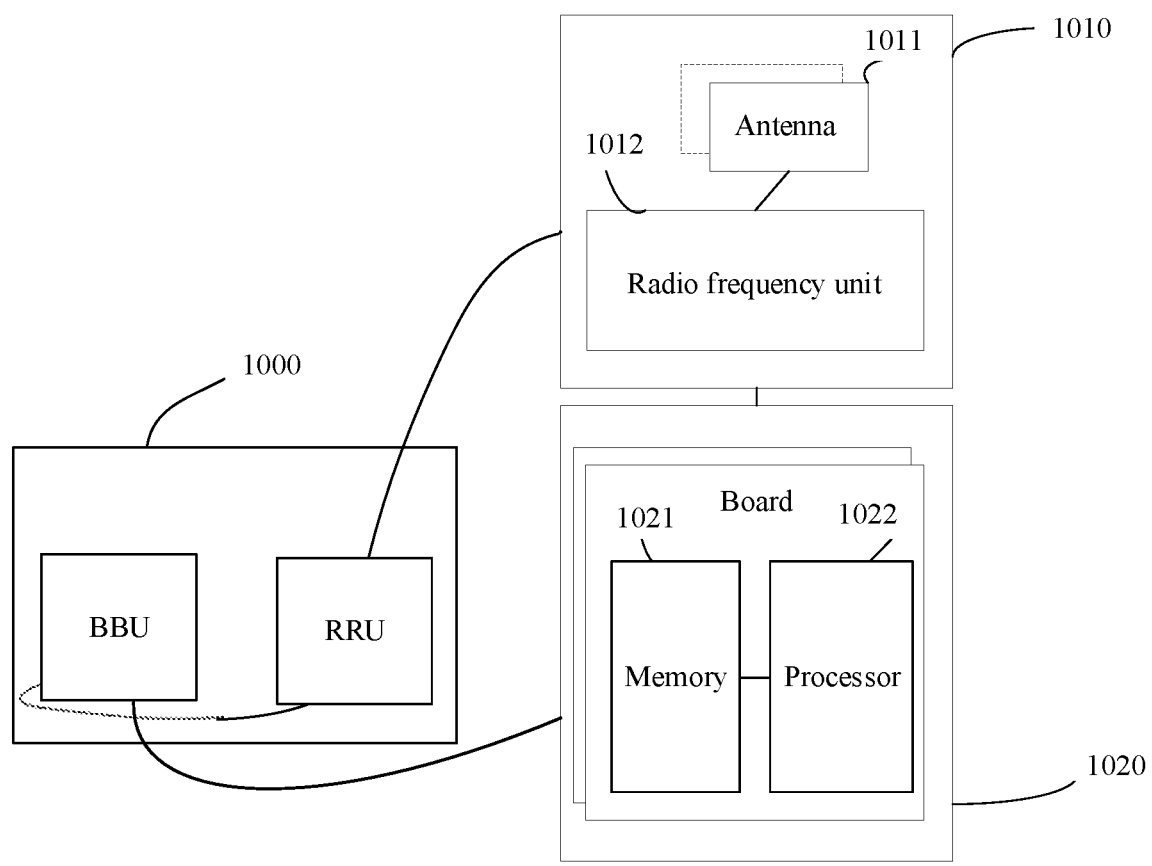
FIG. 15 is a schematic diagram of a structure of a network device according to an embodiment of this application.

FIG. 15 is a schematic diagram of a structure of a network device 1000 according to an embodiment of this application. The network device 1000 may be configured to implement a function of the access network device (for example, the first access network device) in the foregoing methods. The network device 1000 includes one or more radio frequency units such as a remote radio unit (remote radio unit, RRU) 1010 and one or more baseband units (baseband units, BBUs) 1020 (where the baseband unit may also be referred to as a digital unit, DU). The RRU 1010 may be referred to as a transceiver unit, a transceiver circuit, a transceiver, or the like, and may include at least one antenna 1011 and a radio frequency unit 1012. The RRU 1010 is mainly configured to: send and receive a radio frequency signal and perform conversion between a radio frequency signal and a baseband signal, for example, configured to send a signaling message in the foregoing embodiments to a terminal device. The BBU 1020 is mainly configured to perform baseband processing, control a base station, and so on. The RRU 1010 and the BBU 1020 may be physically disposed together, or may be physically disposed separately, in other words, the base station may be a distributed base station.

The BBU 1020 is a control center of the base station, may also be referred to as a processing unit, and is mainly configured to implement a baseband processing function, for example, channel coding, multiplexing, modulation, and spectrum spreading. For example, the BBU (the processing unit) 1020 may be configured to control the access network device to perform an operation procedure related to the access network device in the foregoing method embodiments.

In an example, the BBU 1020 may include one or more boards, and a plurality of boards may jointly support a radio access network (such as an LTE system or a 5G system) of a single access standard, or may separately support radio access networks of different access standards. The BBU 1020 further includes a memory 1021 and a processor 1022. The memory 1021 is configured to store necessary instructions and data. The processor 1022 is configured to control the access network device for necessary actions, for example, configured to control the access network device for an operation procedure related to the access network device in the foregoing method embodiments. The memory 1021 and the processor 1022 may serve the one or more boards. In other words, the memory and the processor may be disposed on each board. Alternatively, the plurality of boards may share a same memory and a same processor. In addition, a necessary circuit may further be disposed on each board.

In a possible implementation, with development of a system-on-a-chip (system-on-a-chip, SoC) technology, all or some functions of the BBU 1020 and the RRU 1010 may be implemented by using the SoC technology, for example, implemented by using a base station function chip. The base station function chip integrates components such as a processor, a memory, and an antenna interface. A program of a base station—related function is stored in the memory. The processor executes the program to implement the base station—related function. Optionally, the base station function chip can also read an external memory of the chip, to implement the base station—related function.

It should be understood that the structure of the network device shown in FIG. 15 is merely a possible form, and should not constitute any limitation on embodiments of this application. This application does not exclude a possibility that a base station structure of another form may appear in the future.

According to the method provided in embodiments of this application, an embodiment of this application further provides a communication system, including the foregoing access network device and terminal device.

It should be understood that, the processor in embodiments of this application may be a central processing unit (central processing unit, CPU), or may be another general-purpose processor, a digital signal processor (digital signal processor, DSP), an application-specific integrated circuit (application-specific integrated circuit, ASIC), a field programmable gate array (field programmable gate array, FPGA), or another programmable logic device, discrete gate or transistor logic device, discrete hardware component, or the like. The general-purpose processor may be a microprocessor, or the processor may further be any conventional processor, or the like.

It may be understood that the memory in embodiments of this application may be a volatile memory or a non-volatile memory, or may include a volatile memory and a non-volatile memory. The non-volatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), used as an external cache. By way of example and not limitation, random access memories (random access memories, RAMs) in many forms may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

All or some of the foregoing embodiments may be implemented using software, hardware, firmware, or any combination thereof. When the software is used to implement embodiments, all or some of the foregoing embodiments may be implemented in a form of a computer program product. The computer program product includes one or more computer instructions or computer programs. When the computer instructions or the computer programs are loaded or executed on a computer, all or some of the procedures or functions according to embodiments of this application are generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

An embodiment of this application further provides a computer-readable medium that stores a computer program. When the computer program is executed by a computer, steps performed by the access network device or the terminal device in any one of the foregoing embodiments are implemented.

An embodiment of this application further provides a computer program product. When the computer program product is executed by a computer, steps performed by the access network device or the terminal device in any one of the foregoing embodiments are implemented.

An embodiment of this application further provides a system chip. The system chip includes a communication unit and a processing unit. The processing unit may be, for example, a processor. The communication unit may be, for example, an input/output interface, a pin, or a circuit. The processing unit may execute computer instructions, so that the chip in a communication apparatus performs steps performed by the access network device or the terminal device in the foregoing embodiments of this application.

Optionally, the computer instructions are stored in a storage unit.

An embodiment of this application further provides a communication system, including the access network device and the terminal device in the foregoing embodiments.

Embodiments of this application may be used independently, or may be used jointly. This is not limited herein.

In addition, aspects or features of this application may be implemented as a method, an apparatus, or a product that uses standard programming and/or engineering technologies. The term "product" used in this application covers a computer program that can be accessed from any computer-readable component, carrier or medium. For example, a computer-readable medium may include but is not limited to: a magnetic storage component (for example, a hard disk, a floppy disk, or a magnetic tape), an optical disc (for example, a compact disc (compact disc, CD) and a digital versatile disc (digital versatile disc, DVD)), a smart card, and a flash memory component (for example, an erasable programmable read-only memory (erasable programmable read-only memory, EPROM), a card, a stick, or a key drive). In addition, various storage media described in this specification may indicate one or more devices and/or other machine-readable media that are configured to store information. The term "machine-readable media" may include but is not limited to a radio channel, and various other media that can store, contain, and/or carry instructions and/or data.

It should be understood that in the foregoing embodiments, terms such as "first" and "second" are merely intended to distinguish between different objects, and should not constitute any limitation on this application.

It should be further understood that the term "and/or" describes an association relationship between associated objects and represents that three relationships may exist. For example, A and/or B may represent the following three cases: Only A exists, both A and B exist, and only B exists. The character "/" generally indicates an "or" relationship between the associated objects. "At least one" means one or more. "At least one of A and B", similar to "A and/or B", describes an association relationship between the associated objects and represents that three relationships may exist. For example, at least one of A and B may represent the following three cases: Only A exists, both A and B exist, and only B exists.

A person of ordinary skill in the art may be aware that, with reference to the examples described in embodiments disclosed in this specification, units and algorithm steps may be implemented by electronic hardware or a combination of computer software and electronic hardware. Whether functions are performed in a hardware or software manner depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual coupling or direct coupling or communication connection may be implemented through some interfaces. The indirect coupling or communication connection between the apparatuses or units may be implemented in an electrical, mechanical, or another form.

The units described as separate parts may or may not be physically separate, and parts displayed as units may or may not be physical units, may be located in one position, or may be distributed on a plurality of network units. Some or all of the units may be selected based on an actual requirement to achieve the objectives of the solutions of embodiments.

In addition, functional units in embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The storage medium includes any medium that can store program code, such as a USB flash drive, a removable hard disk, a read only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
receiving, by an access stratum of a terminal device, first configuration information from a first access network device, wherein the first configuration information indicates the terminal device to perform application-layer quality of experience (QoE) measurement, and indicates the first access network device is a master node or a secondary node of the terminal device;
sending, by the access stratum of the terminal device, the first configuration information and first indication information to an upper layer of the access stratum of the terminal device;
receiving, by the access stratum of the terminal device, a quality of experience (QoE) QoE measurement result and the first indication information from the upper layer of the access stratum; and
determining, by the access stratum of the terminal device based on the first indication information, to send the QoE measurement result to the master node or the secondary node of the terminal device.

2. The communication method according to claim 1, further comprising:
receiving, by the access stratum of the terminal device, a second indication information from the first access network device, wherein the second indication information indicates that the first access network device is the master node or the secondary node of the terminal device.

3. The communication method according to claim 1, wherein before the receiving, by the access stratum of the terminal device, a QoE measurement result and the first indication information from the upper layer of the access stratum, the method further comprises:
receiving, by the access stratum of the terminal device, third indication information from a second access network device, wherein the third indication information indicates the access stratum of the terminal device to send the QoE measurement result to the first access network device, and wherein:
the first access network device is the master node and the second access network device is the secondary node; or
the first access network device is the secondary node and the second access network device is the master node.

4. The communication method according to claim 1, wherein the first indication information comprises at least one of a trace identifier (ID), a trace collection entity identifier (TCE ID), QoE service type information, node type information, radio access technology (RAT) type information, a protocol data unit (PDU) session identifier, a 5G quality of service identifier (5QI), a quality of service flow identifier (QFI), or a first identifier, and wherein the first identifier is allocated by an operation, administration and maintenance (OAM) or an access network device.

5. The communication method according to claim 1, further comprising:
determining, by the access stratum of the terminal device, that a bearer type corresponding to a service type of QoE measurement changes; and
sending, by the access stratum of the terminal device, first information to the upper layer of the access stratum in response to determining that the bearer type changes, wherein the first information is used to trigger reporting of the QoE measurement result, or the first information is used to notify the bearer type corresponding to the service type of QoE measurement before and after the bearer type changes.

6. The communication method according to claim 5, wherein the first information is used to notify the bearer type corresponding to the service type of QoE measurement before and after the bearer type changes, and the method further comprises:
receiving, by the access stratum of the terminal device, second information from the upper layer of the access stratum, wherein the second information indicates bearer types of a service type corresponding to the QoE measurement result in different time periods.

7. The communication method according to claim 6, further comprising:
receiving, by the access stratum of the terminal device from the upper layer of the access stratum, time information corresponding to the bearer types in the different time periods.

8. The communication method according to claim 1, further comprising:
receiving third information from a third access network device, wherein the third information indicates an area scope of QoE measurement, the area scope comprises area scope information of at least two radio access technologies (RATs), and the third access network device is the master node or the secondary node of the terminal device.

9. A communication apparatus of a terminal device, comprising:
one or more processors; and
a non-transitory computer readable medium storing one or more instructions that when executed by the one or more processors, cause the communication apparatus to perform operations comprising:
receiving, by an access stratum of a terminal device, first configuration information from a first access network device, wherein the first configuration information indicates the terminal device to perform application-layer quality of experience (QoE) measurement, and indicates the first access network device is a master node or a secondary node of the terminal device;
sending, by the access stratum of the terminal device, the first configuration information and first indication information to an upper layer of the access stratum of the terminal device;
receiving, by the access stratum of the communication apparatus, a quality of experience (QoE) QoE measurement result and the first indication information from the upper layer of the access stratum; and
determining, by the access stratum of the communication apparatus, based on the first indication information, to send the QoE measurement result to the master node or the secondary node of the terminal device.

10. The communication apparatus according to claim 9, the operations further comprise:
receiving, by the access stratum of the communication apparatus, a second indication information from the first access network device, wherein the second indication information indicates that the first access network device is the master node or the secondary node of the terminal device.

11. The communication apparatus according to claim 9, wherein the operations further comprise:
before receiving the QoE measurement result and the first indication information from the upper layer of the access stratum, receiving, by the access stratum of the communication apparatus, third indication information from a second access network device, wherein the third indication information indicates the access stratum of the terminal device to send the QoE measurement result to the first access network device, and wherein:
the first access network device is the master node and the second access network device is the secondary node; or
the first access network device is the secondary node and the second access network device is the master node.

12. The communication apparatus according to claim 9, wherein the operations further comprise:
determining, by the access stratum of the communication apparatus, that a bearer type corresponding to a service type of QoE measurement changes; and
sending, by the access stratum of the communication apparatus, first information to the upper layer of the access stratum in response to determining that the bearer type changes, wherein the first information is used to trigger reporting of the QoE measurement result, or the first information is used to notify the bearer type corresponding to the service type of QoE measurement before and after the bearer type changes.

13. The communication apparatus according to claim 12, wherein the first information is used to notify the bearer type corresponding to the service type of QoE measurement before and after the bearer type changes, and wherein the operations further comprise:
receiving, by the access stratum of the communication apparatus, second information from the upper layer of the access stratum, wherein the second information indicates bearer types of a service type corresponding to the QoE measurement result in different time periods.

14. The communication apparatus according to claim 13, wherein the operations further comprise:
receiving, by the access stratum of the terminal device from the upper layer of the access stratum, time information corresponding to the bearer types in the different time periods.

15. The communication apparatus according to claim 9, wherein the first indication information comprises at least one of a trace identifier (ID), a trace collection entity identifier (TCE ID), QoE service type information, node type information, radio access technology (RAT) type information, a protocol data unit (PDU) session identifier, a 5G quality of service identifier (5QI), a quality of service flow identifier (QFI), or a first identifier, and wherein the first identifier is allocated by an operation, administration and maintenance (OAM) or an access network device.

16. The communication apparatus according to claim 9, wherein the operations further comprise:
receiving third information from a third access network device, wherein the third information indicates an area scope of QoE measurement, the area scope comprises area scope information of at least two radio access technologies (RATs), and the third access network device is the master node or the secondary node of the terminal device.

17. A communication apparatus, comprising:
one or more processors; and
a non-transitory computer readable medium storing one or more instructions that when executed by the one or more processors, cause the communication apparatus to perform operations comprising:
determining, by a first access network device, first indication information, wherein the first indication information indicates a terminal device to send a quality of experience (QoE) measurement result to a second access network device;
sending the first indication information to an access stratum of the terminal device, the access stratum of the terminal device being configured to send the first indication information to an upper layer of the access stratum of the terminal device for performing a QoE measurement, the upper layer of the access stratum of the terminal device being configured to send the QoE measurement result and the first indication information to the access stratum of the terminal device;
receiving the QoE measurement result from the access stratum of the terminal device; and
sending the QoE measurement result to the second access network device, wherein the first access network device is a master node or a secondary node of the terminal device.

18. The communication apparatus according to claim 17, wherein the first access network device and the second access network device is a same access network device.

19. The communication apparatus according to claim 17, wherein:

the first access network device is a master node of the terminal device and the second access network device is a secondary node of the terminal device; or the first access network device is a secondary node of the terminal device and the second access network device is a master node of the terminal device.

20. The communication apparatus according to claim 17, wherein the first indication information comprises at least one of a trace identifier (ID), a trace collection entity identifier (TCE ID), QoE service type information, node type information, radio access technology (RAT) type information, a protocol data unit (PDU) session identifier, a 5G quality of service identifier (5QI), a quality of service flow identifier (QFI), or a first identifier, and wherein the first identifier is allocated by an operation, administration and maintenance (OAM) or an access network device.

* * * * *